United States Patent
Goto et al.

(10) Patent No.: US 9,752,710 B2
(45) Date of Patent: Sep. 5, 2017

(54) TUBULAR THREADED JOINT HAVING IMPROVED HIGH TORQUE PERFORMANCE

(71) Applicants: NIPPON STEEL & SUMITOMO METAL CORPORATION, Tokyo (JP); VALLOUREC OIL AND GAS FRANCE, Aulnoye-Aymeries (FR)

(72) Inventors: Kunio Goto, Tokyo (JP); Yuji Tanaka, Tokyo (JP); Yasuhiro Yamamoto, Tokyo (JP)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 563 days.

(21) Appl. No.: 14/348,923

(22) PCT Filed: Nov. 16, 2012

(86) PCT No.: PCT/JP2012/080403
§ 371 (c)(1),
(2) Date: Apr. 1, 2014

(87) PCT Pub. No.: WO2013/073712
PCT Pub. Date: May 23, 2013

(65) Prior Publication Data
US 2014/0284919 A1 Sep. 25, 2014

(30) Foreign Application Priority Data
Nov. 18, 2011 (JP) ................... 2011-253187

(51) Int. Cl.
| | |
|---|---|
| *F16L 15/08* | (2006.01) |
| *F16L 15/04* | (2006.01) |
| *F16L 15/06* | (2006.01) |
| *F16L 58/18* | (2006.01) |
| *F16L 15/00* | (2006.01) |
| *C10M 169/04* | (2006.01) |
| *C10M 111/04* | (2006.01) |

(52) U.S. Cl.
CPC ............ *F16L 15/08* (2013.01); *C10M 111/04* (2013.01); *C10M 169/04* (2013.01);
(Continued)

(58) Field of Classification Search
CPC .......................... C10N 2330/12; F16L 58/182
(Continued)

(56) References Cited

U.S. PATENT DOCUMENTS

| | | | | |
|---|---|---|---|---|
| 5,253,902 A | * | 10/1993 | Petelot | .................. F16L 15/001 285/333 |
| 6,933,264 B2 | * | 8/2005 | Petelot | .................. F16L 58/182 285/333 |

(Continued)

FOREIGN PATENT DOCUMENTS

| | | |
|---|---|---|
| AU | 2012337667 | 8/2015 |
| CN | 101627246 | 1/2010 |

(Continued)

*Primary Examiner* — David E Bochna
(74) *Attorney, Agent, or Firm* — Clark & Brody

(57) ABSTRACT

A tubular threaded joint is constituted by a pin and a box each having a contact surface comprising an unthreaded metal contact portion including a seal portion and a shoulder portion and a threaded portion. Of the contact surface of at least one of the pin and the box, the surfaces of the seal portion and the shoulder portion has a first lubricating coating in the form of a solid lubricating coating, and the surface of the threaded portion or the entire surface of the contact surface has a second lubricating coating selected from a viscous liquid lubricating coating and a solid lubricating coating. The first lubricating coating has a coefficient of friction which is higher than that of the second lubricating coating, and the second lubricating coating is positioned on top in a portion where both the first lubricating coating and the second lubricating coating are present.

9 Claims, 6 Drawing Sheets

(52) U.S. Cl.
CPC ............ *F16L 15/004* (2013.01); *F16L 15/04* (2013.01); *F16L 15/06* (2013.01); *F16L 58/182* (2013.01); *C10M 2201/041* (2013.01); *C10M 2201/0413* (2013.01); *C10M 2201/062* (2013.01); *C10M 2205/183* (2013.01); *C10M 2207/026* (2013.01); *C10M 2207/1203* (2013.01); *C10M 2207/1265* (2013.01); *C10M 2209/084* (2013.01); *C10M 2209/0845* (2013.01); *C10M 2215/064* (2013.01); *C10N 2210/02* (2013.01); *C10N 2210/04* (2013.01); *C10N 2230/12* (2013.01); *C10N 2230/64* (2013.01); *C10N 2250/08* (2013.01); *C10N 2250/10* (2013.01); *C10N 2250/14* (2013.01); *C10N 2280/00* (2013.01)

(58) Field of Classification Search
USPC .......................... 285/333, 334; 427/258, 409
See application file for complete search history.

(56) References Cited

U.S. PATENT DOCUMENTS

| | | | | |
|---|---|---|---|---|
| 8,172,278 | B2* | 5/2012 | Abbott | F16L 19/0286 427/409 |
| 8,276,946 | B2* | 10/2012 | Kimoto | F16L 58/182 285/333 |
| 8,535,762 | B2* | 9/2013 | Nunez | C23C 28/00 427/258 |
| 2009/0033087 | A1* | 2/2009 | Carcagno | F16L 58/182 285/55 |
| 2010/0301600 | A1* | 12/2010 | Goto | F16L 58/182 285/333 |
| 2011/0025052 | A1* | 2/2011 | Goto | F16L 15/005 285/333 |
| 2011/0084483 | A1 | 4/2011 | Nunez | |
| 2014/0284919 | A1* | 9/2014 | Goto | F16L 58/182 285/94 |

FOREIGN PATENT DOCUMENTS

| | | |
|---|---|---|
| EP | 2210931 | 7/2010 |
| JP | 05-087275 | 4/1993 |
| JP | 2002-173692 | 6/2002 |
| JP | 2002-327874 | 11/2002 |
| JP | 2004-53013 | 2/2004 |
| JP | 2005-337469 | 12/2005 |
| WO | 2006/104251 | 10/2006 |
| WO | 2007/042231 | 4/2007 |
| WO | 2007/063079 | 6/2007 |
| WO | 2009/072486 | 6/2009 |
| WO | 2011/027433 | 3/2011 |

* cited by examiner

TUBULAR THREADED JOINT HAVING IMPROVED HIGH TORQUE PERFORMANCE

TECHNICAL FIELD

This invention relates to a tubular threaded joint used for connecting steel pipes and particularly oil country tubular goods and to a surface treatment method therefor. A tubular threaded joint according to the present invention can reliably exhibit excellent galling resistance without the application of a lubricating grease such as compound grease which in the past has been applied to threaded joints each time when makeup of oil country tubular goods is carried out. Therefore, a tubular threaded joint according to the present invention can avoid the adverse effects on the global environment and humans caused by compound grease. In addition, the joint does not readily yield even if makeup is carried out with a high torque, thereby making it possible to realize a stable metal-to-metal seal with an adequate operating margin.

BACKGROUND ART

Oil country tubular goods such as tubing and casing used for excavation of oil wells for exploitation of crude oil or gas oil are usually connected with each other (made up) using tubular threaded joints. In the past, the depth of oil wells was 2,000-3,000 meters, but in deep wells such as recent oil fields in the sea, the depth sometimes reaches 8,000-10,000 meters or larger. The length of oil country tubular goods is typically 10 some meters, and tubing through which a fluid such as crude oil flows is surrounded by a plurality of casings. Therefore, the number of oil country tubular goods which are connected by threaded joints reaches a huge number.

Since tubular threaded joints for oil country tubular goods are subjected in their environment of use to loads in the than of tensile forces in the axial direction caused by the mass of oil country tubular goods and the joints themselves, compound pressures such as internal and external pressures, and geothermal heat, they need to maintain gas tightness without being damaged even in such severe environments.

Typical tubular threaded joints used for connecting oil country tubular goods (also referred to as special threaded joints) have a pin-box structure. A pin, which is a joint component having male (external) threads, is typically formed on the outer surface of both ends of an oil country tubular good, and a box, which is a counterpart joint component having female (internal) threads which engage with the male threads, is typically formed on the inner surface of both sides of a coupling, which is a separate member. As shown in FIG. 1, the pin has a shoulder portion (also referred to as a torque shoulder) formed on the end surface at the tip of the pin and a seal portion formed between the end surface and the male threads. Correspondingly, the box has a seal portion and a shoulder portion located in the rear of the female threads and adapted to contact the seal portion and the shoulder portion of the pin, respectively. The seal portions and the shoulder portions of the pin and the box constitute unthreaded metal contact portions of a tubular threaded joint, and the unthreaded metal contact portions and the threaded portions of the pin and the box constitute contact surfaces of a tubular threaded joint. Below-described Patent Document 1 discloses an example of such a special threaded joint.

In order to perform makeup of this tubular threaded joint, one end (the pin) of an oil country tubular good is inserted into a coupling (box), and the male threads and the female threads are tightened until the shoulder portions of the pin and the box contact each other and interfere with a suitable torque. As a result, the seal portions of the pin and the box intimately contact each other to form a metal-to-metal seal which guarantees the gas tightness of the threaded joint.

Due to various troubles occurring during the process of lowering tubing or casing into an oil well, it is sometimes necessary to loosen a threaded joint which has been made up, raise the joint from the oil well, retighten it, and again lower it into the well. API (American Petroleum Institute) requires galling resistance such that unrepairable seizing referred to as galling does not take place and gas tightness is maintained even if tightening (makeup) and loosening (breakout) are carried out 10 times on a joint for tubing and 3 times on a joint for casing.

In order to increase galling resistance and gas tightness, a viscous liquid lubricant (lubricating grease) referred to as compound grease or dope and containing heavy metal powder has been previously applied to the contact surfaces of a threaded joint each time makeup is carried out. Such compound grease is prescribed by API BUL 5A2.

With the object of increasing the retention of compound grease and improving sliding properties, it has been proposed to subject the contact surfaces of a threaded joint to various types of surface treatment to form one or more layers such as nitride treatment, various types of plating including galvanizing and dispersion plating, and phosphate chemical conversion treatment. However, as stated below, the use of compound grease may have adverse effects on the environment and humans.

Compound grease contains large amounts of powder of heavy metals such as zinc, lead, and copper. At the time of makeup of a threaded joint, the applied grease is washed off or overflows to the outer surface, and it can have an adverse effect on the environment and especially on sea life particularly due to harmful heavy metals such as lead. In addition, the process of applying compound grease worsens the work environment and the work efficiency, and there is also a concern of harm to humans.

In recent years, as a result of the enactment in 1998 of the OSPAR Convention (Oslo-Paris Convention) aimed at preventing marine pollution in the Northeast Atlantic, strict environmental regulations are being enacted on a global scale, and in some regions, the use of compound grease is already being regulated. Accordingly, in order to avoid harmful effects on the environment and humans during the excavation of gas wells and oil wells, a demand has developed for threaded joints which can exhibit excellent galling resistance without using compound grease.

As a threaded joint which can be used to connect oil country tubular goods without application of compound grease, the present applicant proposed in Patent Document 2 a threaded joint for steel pipes having a viscous liquid or semisolid lubricating coating and in Patent Document 3 a threaded joint for steel pipes having a solid lubricating coating.

Patent Document 1: JP 5-87275 A
Patent Document 2: JP 2002-173692 A
Patent Document 3: WO 2009/072486

SUMMARY OF THE INVENTION

As stated above, with a special threaded joint like that shown in FIG. 1 constituted by a pin and a box each with a seal portion, the seal portions of the pin and the box form a metal-to-metal seal to guarantee gas tightness at the end of makeup.

FIG. 2 shows a torque chart at the time of makeup of this type of threaded joint (ordinate: torque, abscissa: number of turns). As shown in this figure, as rotation takes place, the threaded portions of the pin and the box initially contact and torque gradually increases. Subsequently, the seal portions of the pin and the box contact, and the rate of increase of torque increases. Eventually, the shoulder portion at the tip of the pin and the shoulder portion of the box contact and begin to interfere (the torque at the start of this interference is referred to as the shouldering torque Ts), upon which the torque abruptly increases. Makeup is completed when the torque reaches a predetermined makeup torque. The optimum torque in FIG. 2 means the torque that is optimal for the completion of makeup with achieving an amount of interference in the seal portions which is necessary for guaranteeing gas is tightness. A proper value for the optimum torque is predetermined depending on the internal diameter and the type of a joint.

However, in a special threaded joint used in very deep wells in which compressive stresses and bending stresses are applied, makeup is sometimes carried out with a torque which is higher than usual to prevent the tightened thread from loosening. In this case, the shoulder portion at the end of the pin and the shoulder portion of the box which it contacts sometimes yield, leading to plastic deformation of the shoulder portion of at least one member of the pin and the box. As a result, as shown in FIG. 2, the rate of increase of torque suddenly decreases. The torque at the time when yielding and plastic deformation occur is referred to as the yield torque Ty. Yielding of the shoulder portions leads to a failure of gas tightness.

In a threaded joint which is made up with a high torque, it is advantageous for the value of [Ty minus Ts] (Ty−Ts=$\Delta$T, or the torque-on-shoulder resistance) to be large. However, in the tubular threaded joints described in Patent Document 2 having a viscous liquid or semisolid lubricating coating, Ty is low compared to when a conventional compound grease is applied. As a result, $\Delta$T becomes small, and the shoulder portions yield at a low makeup torque, so it is sometimes impossible to perform makeup with a high torque. In the tubular threaded joints described in Patent Document 3 having a solid lubricating coating as well, $\Delta$T becomes smaller than that of a conventional compound grease.

The object of the present invention is to provide a tubular threaded joint which does not readily undergo yielding of its shoulder portions even when it is made up with a high torque and which has a lubricating coating which does not contain harmful heavy metals, which has excellent galling resistance, gas tightness, and rust-preventing properties, and which can afford a large $\Delta$T to the joint.

It was found that even if the composition of a lubricating coating is varied so as to vary its coefficient of friction, $\Delta$T does not greatly change because Ts and Ty typically vary in the same direction. For example, if the coefficient of friction of a lubricating coating increases, Ty increases, but Ts also increases (a phenomenon referred to as high shouldering). As a result, in the worst case, the condition referred to as no-shouldering occurs in which the shoulder portions do not contact at a predetermined makeup torque and makeup cannot be completed.

The present inventors found that with a tubular threaded joint having a viscous liquid or solid lubricating coating which does not contain harmful heavy metals which impose a burden on the global environment, by forming a high-friction solid lubricating coating on a portion of the contact surface (the threaded portion and the unthreaded metal contact portion) of at least one of a pin and a box such as on the shoulder portion which is initially contacted and preferably on the unthreaded metal contact portion including the seal portion and the shoulder portion, and forming on at least the remaining portion of the contact surface a lubricating coating selected from a viscous liquid lubricating coating and a solid lubricating coating having a lower coefficient of friction than the high-friction solid lubricating coating, a tubular threaded joint is obtained which has a large $\Delta$T and which does not undergo no-shouldering while having sufficient galling resistance, gas tightness, and rust-preventing properties.

The mechanism by which a large $\Delta$T is achieved is thought to be generally as follows.

Makeup of a tubular threaded joint is carried out by inserting a pin into a box and then rotating the pin or the box. Initially only the threaded portions of the pin and the box contact and threadingly engage with each other. In the final stage of makeup, the seal portions and the shoulder portions begin to contact, and makeup is completed when a predetermined amount of interference is obtained between the seal portions and the shoulder portions.

As shown in FIG. 5(A), for example, with a tubular threaded joint having a high-friction solid lubricating coating on the seal portions and the shoulder portions of the contact surfaces of both a pin and a box and a lubricating coating having a lower coefficient of friction on the remaining portion (primarily the threaded portions), while only the threaded portions of the pin and the box initially contact, a low friction state is achieved by the lubricating coating having a low coefficient of friction which covers the threaded portions, so Ts becomes low. In the final stage of makeup, when the seal portions and the shoulder portions start to contact, the high-friction solid lubricating coatings which cover these portions contact, causing a high-friction state to occur and causing Ty to increase. As a result, $\Delta$T is increased.

The present invention, which is based on this knowledge, is a tubular threaded joint constituted by a pin and a box each having a contact surface comprising an unthreaded metal contact portion including a seal portion and a shoulder portion and a threaded portion, characterized in that the contact surface of at least one of the pin and the box has a first lubricating coating and a second lubricating coating, the first lubricating coating being a solid lubricating coating faulted on a portion of the contact surface including the shoulder portion, the second lubricating coating being selected from a viscous liquid lubricating coating and a solid lubricating coating and formed on at least the portion of the contact surface where the first lubricating coating is not present, the first lubricating coating having a coefficient of friction which is higher than that of the second lubricating coating, the second lubricating coating being positioned on top in a portion where both the first lubricating coating and the second lubricating coating are present.

The portion of the contact surface having the first lubricating coating may be just the shoulder portion, but preferably it is the entirety of the unthreaded metal contact portion, namely, the seal portion and the shoulder portion.

The second lubricating coating may be provided just on the portion of the contact surface which does not have the first lubricating coating, or it may be provided on the entire contact surface having the first lubricating coating. In the latter case, the second lubricating coating is positioned on top of the first lubricating coating.

Preferred coating thicknesses of each coating are as follows.

The coating thickness of the first lubricating coating is 5-40 μm.

The coating thickness of the viscous liquid lubricating coating as a second lubricating coating is 5-200 μm. However, when this viscous liquid lubricating coating is positioned on top of the first lubricating coating, the total of the coating thickness of the first lubricating coating and that of the viscous liquid lubricating coating is at most 200 μm.

The coating thickness of the solid lubricating coating as a second lubricating coating is 5-150 μm. However, when this solid lubricating coating is positioned on top of the first lubricating coating, the total of the coating thickness of the first lubricating coating and that of the second solid lubricating coating is at most 150 μm.

When the contact surface of only one of the pin and the box has the first lubricating coating and the second lubricating coating as described above, there are no particular limitations concerning the contact surface of the other member of the pin and the box, and it may be in an untreated state (for example, it may be in a state after the below-described preparatory surface treatment). Preferably, however, at least a portion of the contact surface of the other member and preferably the entirety of the contact surface has any of the following surface treatment coatings formed thereon:

1) a lubricating coating selected from a viscous liquid lubricating coating and a solid lubricating coating, 2) a solid anticorrosive coating, or 3) a lower layer in the form of a lubricating coating selected from a viscous liquid lubricating coating and a solid lubricating coating, and an upper layer in the form of a solid anticorrosive coating.

The solid anticorrosive coating is preferably a coating based on an ultraviolet curing resin. The lubricating coating may be either the above-described first lubricating coating or the second solid lubricating coating.

The contact surface of at least one and preferably both of the pin and the box can be previously subjected to surface treatment by a method selected from one or more of blasting treatment, pickling, phosphate chemical conversion treatment, oxalate chemical conversion treatment, borate chemical conversion treatment, electroplating, and impact plating in order to increase the adhesion and the retention of a coating formed atop the contact surface and/or to increase the galling resistance of the threaded joint.

In a tubular threaded joint according to the present invention, a lubricating coating which is formed on its contact surfaces exhibits a large ΔT as observed with a coating made of a conventional lubricating grease such as compound grease which contains harmful heavy metals. Therefore, even at the time of makeup with a high torque, it is possible to perform makeup without the occurrence of yielding or galling of the shoulder portions. In addition, galling can be suppressed even under severe conditions such as during unstable excavation operations in the sea. Furthermore, since the lubricating coating contains substantially no harmful heavy metals such as lead, it poses almost no burden on the global environment. A tubular threaded joint according to the present invention suppress the occurrence of rust, and it can continue to exhibit a lubricating function even when subjected to repeated makeup and breakout, so it can guarantee gas tightness after makeup.

MODES FOR CARRYING OUT THE INVENTION

Below, embodiments of a tubular threaded joint according to the present invention will be explained in detail by way of example. The present invention is not limited to the below-mentioned embodiments.

Figure 3:
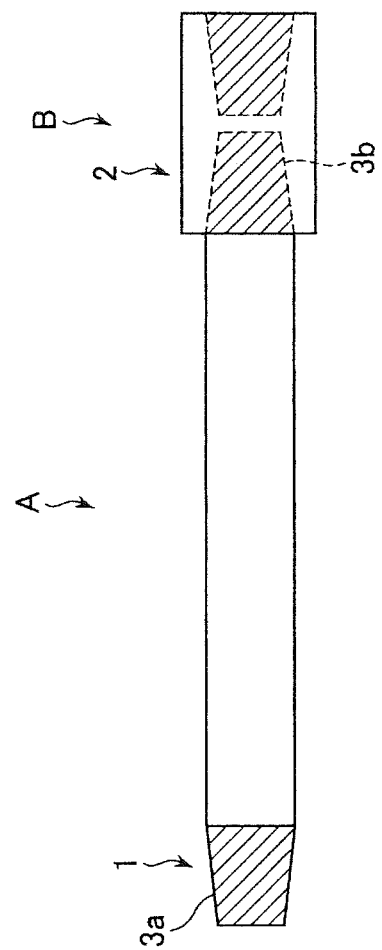
FIG. 3 schematically shows the assembled structure of a steel pipe and a coupling at the time of shipment of the steel pipe.

FIG. 3 schematically shows the state of a typical tubular threaded joint at the time of shipment. A pin 1 having a male threaded portion 3a is formed on the outer surface of both ends of a steel pipe A, and a box 2 having a female threaded portion 3b is formed on the inner surface of both sides of a coupling B. The coupling B is previously connected to one end of the steel pipe A. Although not shown in the drawing, a protector for protecting the threaded portions is previously mounted on the unconnected pin of the steel pipe A and the unconnected box of the coupling B before shipment. These protectors are removed from the threaded joint before use.

As shown in the drawing, in a typical tubular threaded joint, a pin is formed on the outer surface of both ends of a steel pipe and a box is formed on the inner surface of a coupling, which is a separate member. There are also integral tubular threaded joints which do not utilize a coupling and in which one end of a steel pipe is made a pin and the other end is made a box. A tubular threaded joint according to the present invention can be of either type.

Figure 4:
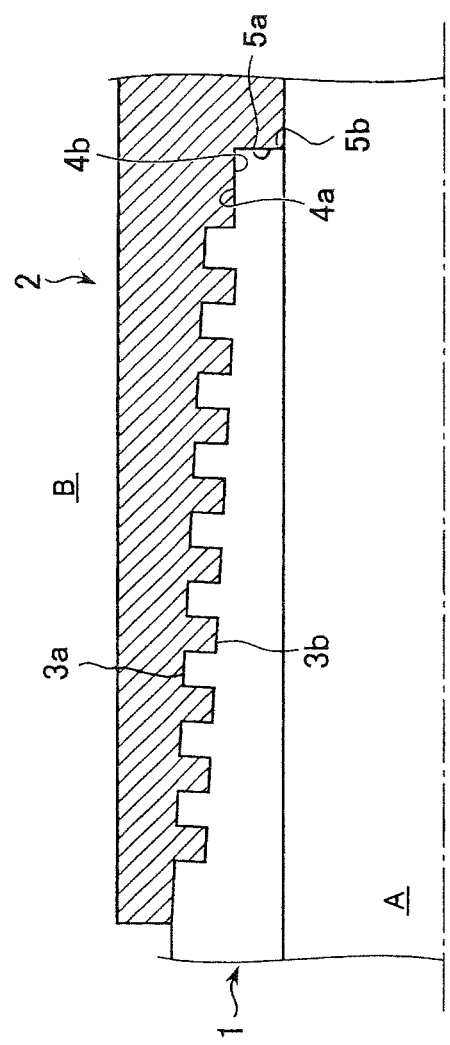
FIG. 4 schematically shows a cross section of a special threaded joint.

FIG. 4 schematically shows the structure of a special threaded joint (referred to below simply as a threaded joint), which is a typical tubular threaded joint used for connecting oil country tubular goods. This threaded joint is constituted by a pin 1 formed on the outer surface of an end of a steel pipe A and a box 2 formed on the inner surface of a coupling B. The pin 1 has a male threaded portion 3a, a seal portion 4a located near the tip of the steel pipe, and a shoulder portion 5a at its end surface. Correspondingly, the box 2 has a female threaded portion 3b, and a seal portion 4b and a shoulder portion 5b on its inner side.

The seal portions and the shoulder portions of the pin 1 and the box 2 are unthreaded metal contact portions, and the unthreaded metal contact portions (namely, the seal portions and the shoulder portions) and the threaded portions are the contact surfaces of the threaded joint. These contact surfaces need to have galling resistance, gas tightness, and rust-preventing properties. In the past, to provide these properties, (a) a compound grease containing heavy metal powder has been applied to the contact surface of at least one of the pin and the box, or (b) a viscous liquid, semisolid, or solid lubricating coating has been formed on the contact surface. However, as stated above, (a) has the problem that it has an adverse effect on humans and the environment, and (b) has the problem of a small ΔT whereby when makeup is carried out with a high torque, there is the possibility of yielding of the shoulder portions occurring before completion of makeup.

A threaded joint according to the present invention has a first lubricating coating and a second lubricating coating on the contact surface of at least one member of the pin and the box. The first lubricating coating is a solid lubricating coating formed on a portion of the contact surface including at least the shoulder portion. The second lubricating coating is selected from a viscous liquid lubricating coating and a solid lubricating coating and formed on at least the portion of the contact surface where the first lubricating coating is not present. The first lubricating coating is a coating having relatively high friction with a coefficient of friction which is higher than the coefficient of friction of the second lubricating coating.

Below, the first lubricating coating will be referred to as a high-friction solid lubricating coating, and when the second lubricating coating is a solid lubricating coating, that solid lubricating coating will sometimes be referred to as a second solid lubricating coating.

In the locations close to the threaded portions between the threaded portions and the seal portions of the pin and the box of a threaded joint, a portion where the pin and the box do not contact each other when the threaded joint is made up is provided with the object of preventing lubricating components from oozing out at the time of makeup of the threaded joint. In some threaded joints, a non-contacting region where the pin and the box intentionally do not contact is provided. Such portions where the pin and the box do not contact each other at the time of makeup are not part of the contact surfaces, and it does not matter whether a coating according to the present invention is applied to these portions.

A high-friction solid lubricating coating which is the first lubricating coating is formed on just a portion of the contact surface of one or both of the pin and the box which includes the shoulder portion. The portion of the contact surface having the high-friction solid lubricating coating may be just the shoulder portion, but preferably it is the entire unthreaded metal contact portion including the seal portion and the shoulder portion. Namely, the high-friction solid lubricating coating is preferably formed on the seal portion and the shoulder portion of the contact surface of at least one of the pin and the box. At least the remaining portion of the contact surface which does not have the high-friction solid lubricating coating has a second lubricating coating selected from a viscous liquid lubricating coating and a solid lubricating coating formed thereon. The second lubricating coating may be formed on the entire contact surface, in which case the second lubricating coating is positioned on top of the high-friction solid lubricating coating (namely, it forms an upper layer). It is also possible for the second lubricating coating to be formed just on the portion where the high-friction solid lubricating coating is not present (e.g., just on the threaded portion).

When the contact surface of only one member of the pin and the box has the high-friction solid lubricating coating and the second lubricating coating, there is no particular limitation on surface treatment of the contact surface of the other member of the pin and the box. For example, a high-friction solid lubricating coating which may be the same as or different from the first lubricating coating, a viscous liquid lubricating coating or a solid lubricating coating which may be the same as or different from the second lubricating coating, a solid anticorrosive coating, and a combination of a lower layer in the form of a lubricating coating and particularly a viscous liquid lubricating coating and an upper layer in the form of a solid anticorrosive coating can be formed on at least a portion of the contact surface and preferably on the entire contact surface of the other member. Alternatively, the contact surface of the other member can be left untreated, or it can be subjected to just the below-described preparatory surface treatment for surface roughening (such as phosphate chemical conversion treatment).

FIGS. 5(A)-(C) and FIGS. 6(A)-(B) show various possible embodiments of combinations of the first and second lubricating coatings. In these figures, of the male threads of the threaded portion of the pin 1, the thread 3a' at the extreme end and closest to the seal portion 4a are formed with an incomplete shape which is observed at the start of thread cutting. By making the thread at the extreme end of the pin incomplete threads, stabbing of the pin becomes easier, and the possibility of damage to the threaded portion of the box at the time of stabbing of the pin is decreased.

Figure 5:
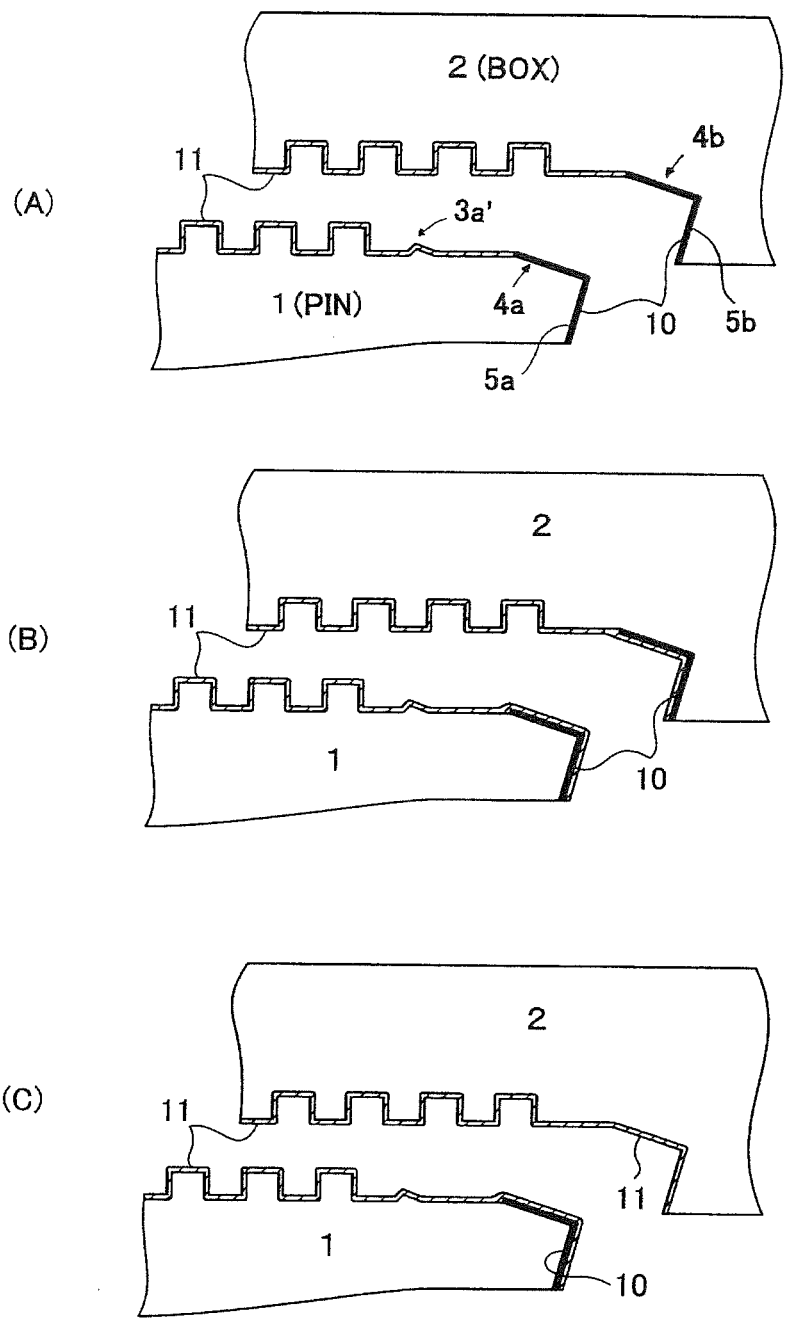
FIGS. 5(A)-5(C) show examples of the structure of coatings on a tubular threaded joint according to the present invention.

FIG. 5(A) shows an embodiment in which the unthreaded metal contact portions (the seal portions and the shoulder portions) of the contact surfaces of both the pin and the box have a high-friction solid lubricating coating 10, and the remainder of each contact surface, which is primarily the threaded portion, has a second lubricating coating 11.

FIG. 5(B) shows an embodiment in which the unthreaded metal contact portions of the contact surfaces of both the pin and the box have a high-friction solid lubricating coating 10, and a second lubricating coating 11 which covers the entirety each contact surface is formed atop each high-friction solid lubricating coating 10.

FIG. 5(C) shows an embodiment in which one of the pin and the box (the pin in the figure) has a high-friction solid lubricating coating 10 which covers the unthreaded metal contact portion and atop it a second lubricating coating 11 which covers the entire contact surface in the same manner as in FIG. 5(B), and the entire contact surface of the other member (the box in the figure) is coated with a second lubricating coating 11.

Figure 6:
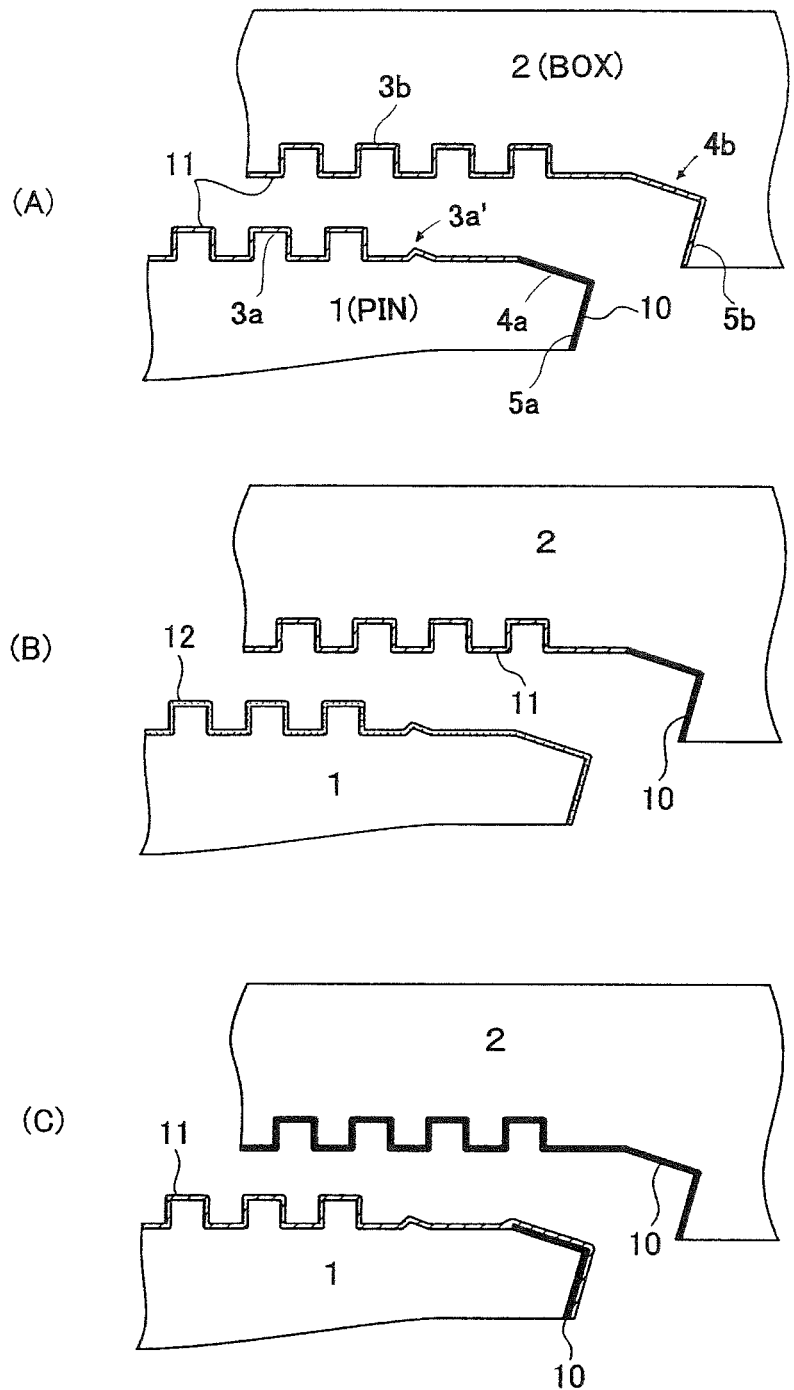
FIGS. 6(A)-6(C) show examples of the structure of different coatings on a tubular threaded joint according to the present invention.

FIG. 6(A) shows an embodiment in which one of the pin and the box (the pin in the figure) has a high-friction solid lubricating coating which covers the to unthreaded metal contact portion and a second lubricating coating 11 which covers the remainder of the contact surface in the same manner as in FIG. 5(A), and the entire contact surface of the other member (the box in the figure) is covered by a second lubricating coating 11.

FIG. 6(B) shows an embodiment in which one of the pin and the box (the box in the figure) has a high-friction solid lubricating coating 10 which covers the unthreaded metal contact portion and a second lubricating coating 11 which covers the remainder of the contact surface in the same manner as in FIG. 5(A), and the entire contact surface of the other member (the pin in the figure) is covered by a solid anticorrosive coating 12.

FIG. 6(C) shows an embodiment in which one of the pin and the box (the pin in the figure) has a high-friction solid lubricating coating 10 which covers the unthreaded metal contact portions and atop it a second lubricating coating 11 which covers the entire contact surface in the same manner as in FIG. 5(B), and the entire contact surface of the other member (the box in the figure) is covered by a high-friction solid lubricating coating 10.

It is understood by those skilled in the art that a tubular threaded joint according to the present invention can have a coating structure which is a combination of coatings other than the combinations described above. For example, the second lubricating coating 11 on one of the pin and the box in FIG. 5(A) or on the pin in FIG. 6(A) can be replaced by a solid anticorrosive coating. In this case, the second lubricating coating 11 which is present on only one member covers the portion on which the high-friction solid lubricating coating is not formed including at least the threaded portion as shown in FIG. 6(B).

Next, various coatings which cover the contact surfaces of a tubular threaded joint according to the present invention will be explained. Unless otherwise specified, % with respect to the content of components of the coatings means mass %. This content is substantially the same as the content based on the total solids content (the total content of nonvolatile components) of a coating composition for forming a lubricating coating.

[High-Friction Solid Lubricating Coating]

The high-friction solid lubricating coating is a solid lubricating coating having a relatively high coefficient of friction compared to the second lubricating coating. It produces a high-friction state in the final stage of makeup of a threaded joint (starting when the shoulder portions of the pin and the box contact until the seal portions intimately contact with a predetermined amount of interference), thereby increasing $\Delta T$ by increasing $T_y$ and making it difficult for yielding of the shoulder portions to take place even when makeup is carried out with a high torque.

In the present invention, a high-friction solid lubricating coating which has such an effect is provided so as to cover a portion of the contact surface including at least the shoulder portion of at least one of a pin and a box. Preferably, the entirety of the unthreaded metal contact portion including the seal portion and the shoulder portion is covered by the high-friction solid lubricating coating. When a threaded joint has a plurality of seal portions and shoulder portions, it is preferable to cover the entirety of the seal portions and the shoulder portions with a high-friction solid lubricating coating. However, the objective of increasing $\Delta T$ can be achieved even if only the shoulder portions where contact initially takes place in the final stage of makeup of a threaded joint are covered with a high-friction solid lubricating coating. The location where a high-friction solid lubricating coating is formed can be suitably set in accordance with the shape of a joint and the required performance.

Even when a second lubricating coating 11 is formed atop the high-friction solid lubricating coating 10 such as on the pin 1 and the box 2 as shown in FIG. 5(B) or on the pin 1 as shown in FIG. 5(C), a high-friction state is achieved by the high-friction solid lubricating coating 10 in the final stage of makeup, and a desired effect of increasing $\Delta T$ can be achieved. The high-friction solid lubricating coating needs to have a higher coefficient of friction than the second lubricating coating 11. A certain degree of adhesion to the substrate (the contact surfaces of the pin and the box, which may be in an as-machined state or may have a preparatory surface treatment coating such as one formed by phosphate chemical conversion treatment or metal plating) is necessary.

An example of a high-friction solid lubricating coating which is suitable for use in the present invention is a coating comprising an organic resin or inorganic polymer which contains little or no solid lubricating particles (such as in an amount of at most 5 mass %, preferably at most 3 mass %, and more preferably at most 1 mass % based on the total solids content).

A particularly preferred high-friction solid lubricating coating is a solid lubricating coating which is formed from a film-forming composition which is used for lubricating treatment before hydroforming of steel. Specific examples of such a composition are Surflube C291 manufactured by Nippon Paint Co., Ltd. (based on a water-soluble resin) and Gardolube L6334 and L6337 manufactured by Chemetall GmbH. A solid lubricating coating formed from this type of composition has a higher coefficient of friction than a lubricating coating used for lubricating threaded joints (such as a lubricating coating selected from a viscous liquid lubricating coating and a second solid lubricating coating used in the present invention), and it forms a solid lubricating coating having good adhesion and affinity to a lubricating coating. However, the solid lubricating coating which is formed still has good lubricating properties and sliding properties, so as shown in FIG. 5(A) and FIG. 6(B), for example, even if a second lubricating coating having a low coefficient of friction is not present on the unthreaded metal contact portion including the shoulder portion, galling resistance necessary for makeup and sufficient gas tightness after makeup are obtained if a second lubricating coating is present on the threaded portions of at least one of the pin and the box.

Another high-friction solid lubricating coating which can be used is a coating comprising the same components as the below-described second solid lubricating coating but which has a reduced content of a solid lubricant (lubricating powder).

The coefficient of friction of a solid lubricating coating or a viscous liquid lubricating coating can be measured in accordance with ASTM D2625 (load carrying capacity and lifespan of solid film lubricants) or ASTM D2670 (wear properties of fluid lubricants) by the Falex pin and Vee block method (referred to below as the Falex method) using a Falex pin and Vee block machine. In the Falex method, blocks (Vee blocks) having a tip with a V-shaped opening are disposed facing opposite sides of a pin, and the pin is rotated while applying a predetermined pressure loading to the blocks to measure the coefficient of friction.

Measurement of the coefficient of friction can be carried out using test pieces constituted by blocks and a pin which are taken from a steel billet made of the same material as used in a tubular threaded joint and which have undergone the same preparatory surface treatment and surface coating treatment. Measurement is carried out at around 1 GPa, which corresponds to the maximum pressure of the seal portions at the time of makeup of a tubular threaded joint, and the average coefficient of friction in a steady frictional state before the occurrence of galling can be compared. Of course, a high-friction solid lubricating coating according to the present invention can be selected based on the coefficient of friction measured using another friction measuring apparatus normally used in a laboratory. Whatever the measurement method, it is sufficient for the coefficient of friction of the high-friction solid lubricating coating to be higher than the coefficient of friction of the second lubricating coating when measurement is carried out under the same conditions.

As long as the high-friction solid lubricating coating according to the present invention has a higher coefficient of friction than the viscous liquid lubricating coating or the second solid lubricating coating used as the second lubricating coating, there is no particular lower limit on the coefficient of friction of the high-friction solid lubricating coating. However, in order to adequately achieve the objective of increasing Ty and increasing ΔT, the coefficient of friction of the high-friction solid lubricating coating is preferably larger by a certain extent than the coefficient of friction of the second lubricating coating. Preferably, the coefficient of friction of the high-friction solid lubricating coating is at least 1.5 times, more preferably at least 2 times, and most preferably at least 2.5 times the coefficient of friction of the second lubricating coating.

The coefficient of friction of the high-friction solid lubricating coating as measured by the above-stated Falex method is preferably at least 0.06, more preferably at least 0.08, and most preferably at least 0.1. Since an extremely high coefficient of friction has an adverse effect on the galling resistance of a threaded joint, the coefficient of friction of the high-friction solid lubricating coating is preferably at most 0.25 and more preferably at most 0.20.

The thickness of the high-friction solid lubricating coating is preferably 5-40 μm. If it is less than 5 μm, the effect of producing a high level of friction at the time of contact and galling resistance may be inadequate. On the other hand, if it exceeds 40 μm, not only does the friction-increasing effect reach a limit but an adverse effect on the properties of the seal portion may develop.

The high-friction solid lubricating coating can be formed by coating methods well known to those skilled in the art. In order to form a high-friction solid lubricating coating on a portion of the contact surface of the pin and/or the box, namely, on only the shoulder portion or on the unthreaded metal contact portion including the seal portion and the shoulder portion, spray coating can be carried out while shielding with a suitable means the portions where it is not desired to form the high-friction solid lubricating coating. Upon drying to evaporate solvents after application, a high-friction solid lubricating coating is formed.

[Viscous Liquid Lubricating Coating]

A viscous liquid lubricating coating can be formed using a lubricating grease which has been conventionally used to improve the galling resistance of the contact surfaces of a threaded joint. It is preferable to use a lubricating grease referred to as green dope which has little adverse effect on the environment and contains no or little heavy metal powder.

A preferred example of such a viscous liquid lubricating coating is a coating comprising a suitable amount of a base oil and at least one material selected from a rosin-based material, wax, metal soap, and a basic metal salt of an aromatic organic acid. Of these components, a rosin-based material is effective primarily at increasing the coefficient of friction of a lubricating coating, namely, at increasing ΔT, while wax, metal soap, and a basic metal salt of an aromatic organic acid are effective primarily at preventing galling of a lubricating coating. Therefore, it is possible for a coating to exhibit adequate lubricating performance even if it does not contain a powder of a soft heavy metal such as lead or zinc. A particularly preferable viscous liquid lubricating coating comprises all of a rosin-based material, wax, metal soap, and a basic metal salt of an aromatic organic acid.

A rosin-based material is selected from rosin and its derivatives. When it is contained in a lubricating coating, it becomes highly viscous when it undergoes a high pressure in a frictional interface. As a result, it is effective at increasing ΔT of the coating. The rosin which is used may be any of tall rosin, gum rosin, and wood rosin, and various rosin derivatives such as rosin esters, hydrogenated rosins, polymerized rosins, and disproportionated rosins can also be used. The content of the rosin-based material in the lubricating coating is preferably 5-30% and more preferably 5-20%.

Wax not only has the effect of preventing galling by decreasing the friction of a lubricating coating, it also decreases the fluidity of the coating and increases the coating strength. Any of animal, vegetable, mineral, and synthetic waxes can be used. Examples of waxes which can be used are beeswax and whale tallow (animal waxes); Japan wax, carnauba wax, candelilla wax, and rice wax (vegetable waxes); paraffin wax, microcrystalline wax, petrolatum, montan wax, ozokerite, and ceresine (mineral waxes); and oxide wax, polyethylene wax, Fischer-Tropsch wax, amide wax, and hardened castor oil (castor wax) (synthetic waxes). Of these, paraffin wax with a molecular weight of 150-500 is preferred. The wax content of a lubricating coating is preferably 2-20%.

A metal soap, which is a salt of a fatty acid with a metal other than an alkali metal, is effective at increasing the galling-preventing effect and the rust-preventing effect of a coating. Its content is preferably 2-20%.

The fatty acid of a metal soap is preferably one having 12-30 carbon atoms from the standpoint of lubricating properties and rust prevention. The fatty acid can be either saturated or unsaturated. Mixed fatty acids derived from natural oils and fats such as beef tallow, lard, wool fat, palm oil, rapeseed oil, and coconut oil, and single compounds such as lauric acid, tridecyclic acid, myristic acid, palmitic acid, lanopalmitic acid, stearic acid, isostearic acid, oleic acid, elaidic acid, arachic acid, behenic acid, erucic acid, lignoceric acid, lanoceric acid, a sulfonic acid, salicylic acid, and a carboxylic acid may be used. The metal salt is preferably in the form of a calcium salt, but it may also be a salt of another alkaline earth metal or a zinc salt. The salt may be either a neutral salt or a basic salt.

A viscous liquid lubricating coating may contain a basic metal salt of an aromatic organic acid selected from basic sulfonates, basic salicylates, basic phenates, and basic carboxylates as a rust-preventing agent. Each of these basic metal salts of an aromatic organic acid is a salt of an aromatic organic acid with excess alkali (an alkali metal or an alkaline earth metal) in which the excess alkali is present as colliodal fine particles dispersed in oil. These basic metal salts are a grease or a semisolid substance at room temperature, and exhibit a lubricating action in addition to a rust-preventing action. The alkali which constitutes the cation part of a basic metal salt of an aromatic organic acid may be an alkali metal or an alkaline earth metal, but preferably it is an alkaline earth metal and particularly calcium, barium, or magnesium, each providing the same effect. Its content in the lubricating coating is preferably 10 to 70%.

The higher the base number of the basic metal salt of an aromatic organic acid used as a rust-preventing agent, the greater the amount of the fine particles of the salt which function as a solid lubricant, and the better the lubricating properties (galling resistance) which can be imparted by the lubricating coating. When the base number exceeds a certain level, the salt has the effect of neutralizing acid components, and the rust-preventing effect of the lubricating coating is increased. For these reasons, it is preferable to use one having a base number (JIS K 2501) of 50-500 mgKOH/g. A preferred base number is 100-500 mg KOH/g, and more preferably it is in the range of 250-450 mg KOH/g.

In order to suppress the fluidity of a viscous liquid lubricating coating at high temperatures and further increase its galling resistance, the lubricating coating may contain a lubricating powder. The lubricating powder can be any harmless one which is not toxic and which does not overly decrease the coefficient of friction. A preferred lubricating powder is graphite. Amorphous graphite which produces little decrease in the coefficient of friction is more preferred. The content of a lubricating powder is preferably 0.5-20%.

In order to increase the uniformity of dispersion of a solid lubricating powder in the lubricating coating or to improve the properties of the lubricating coating, the lubricating coating may include components other than those described above, such as one or more components selected from organic resins and various oils and additives normally used in lubricating oils (such as an extreme pressure agent).

Oils refer to lubricating components which are liquid at room temperature and which can be used in lubricating oils. Oils themselves have lubricating properties. Examples of oils which can be used include synthetic esters, natural oils, and mineral oils. The above-described rust-preventing agents (basic salts of aromatic organic acids) also have lubricating properties, so they also function as oils. The properties of a lubricating coating vary with the content of oil. If a coating does not contain an oil or if the oil content is too low, the lubricating coating does not become a viscous liquid lubricating coating and instead becomes a solid lubricating coating. In the present invention, such a lubricating coating can also be used as a solid lubricating coating.

An organic resin and particularly a thermoplastic resin suppresses tackiness of the lubricating coating and increases the thickness of the coating, and when it is introduced into a frictional interface, it increases galling resistance and decreases friction between contacting metal portions even when a high makeup torque (a high pressure) is applied. Therefore, it may be contained in a lubricating coating. In such cases, it is preferable to use a resin in powder form having a particle diameter in the range of 0.05-30 µm and more preferably in the range of 0.07-20 µm.

Some examples of thermoplastic resins are polyethylene resins, polypropylene resins, polystyrene resins, poly(methyl acrylate) resins, styrene-acrylic acid ester copolymer resins, polyamide resins, and polybutene (polybutylene) resins. A copolymer or blend or of these resins or of these resins and other thermoplastic resins can also be used. The density of the thermoplastic resin (JIS K 7112) is preferably in the range of 0.9-1.2. In addition, in view of the necessity for the resin to readily deform on a frictional surface in order to exhibit lubricating properties, the thermal deformation temperature (JIS K 7206) of the resin is preferably 50-150° C.

When the lubricating coating contains a thermoplastic resin, the content thereof in the coating is preferably at most 10% and more preferably in the range of 0.1-5%. The total content of the above-described rosin-based material and the thermoplastic resin is preferably at most 30%.

Examples of natural oils and fats which can be used as an oil include beef tallow, lard, wool fat, palm oil, rapeseed oil, and coconut oil. A mineral oil (including a synthetic mineral oil) having a viscosity at 40° C. of 10-300 cSt can also be used as an oil.

A synthetic ester which can be used as an oil can increase the plasticity of the thermoplastic resin and at the same time can increase the fluidity of the lubricating coating when subjected to hydrostatic pressure. In addition, a synthetic ester with a high melting point can be used to adjust the melting point and hardness (softness) of the lubricating coating. Examples of a synthetic ester are fatty acid monoesters, dibasic acid diesters, and fatty acid esters of trimethylolpropane or pentaerythritol.

Examples of fatty acid monoesters are monoesters of carboxylic acids having 12-24 carbon atoms with higher alcohols having 8-20 carbon atoms. Examples of dibasic acid diesters are diesters of dibasic acids having 6-10 carbon atoms with higher alcohols having 8-20 carbon atoms. Examples of fatty acids which constitute a fatty acid ester of trimethylolpropane or pentaerythritol are ones having 8-18 carbon atoms.

When a lubricating coating contains at least one of the above oils, the content of the oil is preferably made at least 0.1 mass % in order to obtain an increase in galling resistance. The content is preferably made at most 5 mass % in order to prevent a decrease in the coating strength.

An extreme pressure agent has the effect of increasing the galling resistance of the lubricating coating when added in a small amount. Nonlimiting examples of an extreme pressure agent are vulcanized oils, polysulfides, and phosphates, phosphites, thiophosphates, and dithiophosphoric acid metal salts. When an extreme pressure agent is contained in a lubricating coating, its content is preferably in the range of 0.05-5 mass %.

Examples of preferred vulcanized oils are compounds which contain 5-30 mass % of sulfur and are obtained by adding sulfur to unsaturated animal or vegetable oils such as olive oil, castor oil, rice bran oil, cottonseed oil, rapeseed oil, soy bean oil, corn oil, beef tallow, and lard and heating the mixture.

Examples of preferred polysulfides are polysulfides of the formula $R_1$—$(S)_c$—$R_2$ (wherein $R_1$ and $R_2$ may be the same or different and are an alkyl group having 4-22 carbon atoms, an aryl group, an alkylaryl group, or an arylalkyl group, and c is an integer from 2 to 5) and olefin sulfides containing 2-5 sulfur bonds per molecule. Dibenzyl disulfide, di-tert-dodecyl polysulfide, and di-tert-nonyl polysulfide are particularly preferred.

Phosphates, phosphites, thiophosphates, and dithiophosphoric acid metal salts may be of the following general formulas.

phosphates: $(R_3O)(R_4O)P(=O)(OR_5)$ phosphites: $(R_3O)(R_4O)P(OR_5)$ thiophosphates: $(R_3O)(R_4O)P(=S)(OR_5)$ dithiophosphoric acid metal salts: $[(R_3O)(R_6O)P(=S)—S]_2$-M In the above formulas, $R_3$ and $R_6$ are each an alkyl group having 1 to 24 carbon atoms, a cycloalkyl group, an alkylcycloalkyl group, an aryl group, an alkylaryl group, or an arylalkyl group, $R_4$ and $R_5$ are each a hydrogen atom, an alkyl group having 1 to 24 carbon atoms, a cycloalkyl group, an alkylcycloalkyl group, an aryl group, an alkylaryl group, or an arylalkyl group, and M is molybdenum (Mo), zinc (Zn), or barium (Ba).

In addition to the above-described components, the viscous liquid lubricating coating may contain an antioxidant, a preservative, a colorant, and the like.

A viscous liquid lubricating coating can be formed by applying a coating composition to the contact surfaces of at least one of the pin and the box of a threaded joint, and drying the coating if necessary. Depending on the coating method, the composition which is used may contain a volatile organic solvent in addition to the above-described components.

When the coating composition is a solid or semisolid at room temperature, it may be applied after being heated to lower its viscosity (for example, it may be applied with a spray gun in the form of a hot melt).

When heating is not employed, a solvent is contained in the coating composition to decrease the viscosity of the composition to a viscosity sufficient for application. As a result, the coating thickness and the composition of the lubricating coating which is formed are made uniform and coating formation can be carried out efficiently. Examples of preferred solvents are petroleum solvents such as solvents corresponding to industrial gasoline prescribed by JIS K 2201, mineral spirits, aromatic petroleum naphtha, xylene, and Cellosolves. Two or more of these may be used in combination. A solvent having a flash point of at least 30° C., an initial boiling point of at least 150° C., and a final boiling point of at most 210° C. is preferred because it is relatively easy to handle and it rapidly evaporates, so the drying time can be short.

A preferred coating thickness of the viscous liquid lubricating coating is 5-200 μm and more preferably 15-200 μm. The lubricating coating is preferably sufficiently thick to fill minute interstices in the contact surfaces such as the spaces between threads. If the coating thickness is too small, the effects of components such as a rosin-based material, wax, metal soap, or lubricating powder being supplied to the frictional surface from the interstices due to the action of hydrostatic pressure which develops at the time of makeup can no longer be expected, and the galling resistance of a threaded joint worsens. Furthermore, when the lubricating coating contains a rust-preventing agent, the rust-preventing effect becomes inadequate. On the other hand, making the coating thickness too large is not only wasteful, but it runs counter to preventing environmental pollution, which is one of the objects of the present invention. When a viscous liquid lubricating coating is formed atop a high-friction solid lubricating coating 10 as a second lubricating coating 11 as shown in FIGS. 5(B) and 5(C), the total coating thickness of the high-friction solid lubricating coating and the viscous liquid lubricating coating is preferably at most 200 μm.

[Second Solid Lubricating Coating]

A solid lubricating coating which is used to form the second lubricating coating in the form of the second solid lubricating coating in the present invention is basically constituted by a powder having a solid lubricating action (referred to as a lubricating powder) and a binder. This coating can be formed by applying a dispersion having a lubricating powder dispersed in a binder-containing solution. The lubricating powder is strongly adhered to the surface of a threaded joint in a state in which it is dispersed in the binder in the coating, and at the time of makeup, it is stretched by the makeup pressure to a reduced thickness. As a result, it increases the galling resistance of a threaded joint.

Examples of a lubricating powder include but not limited to molybdenum disulfide, tungsten disulfide, graphite, fluorinated graphite, zinc oxide, tin sulfide, bismuth sulfide, organomolybdenum compounds (e.g., a molybdenum dialkylthiophosphate or a molybdenum dialkylthiocarbamate), PTFE (polytetrafluoroethylene), and BN (boron nitride). One or more of these can be used.

From the standpoints of the adhesion and rust-preventing properties of the solid lubricating coating, graphite is a particularly preferred lubricating powder, and from the standpoint of film-forming properties, amorphous graphite is more preferred. A preferred content of lubricating powder in the solid lubricating coating is 2-15 mass %. In the present invention, it is necessary for the coefficient of friction of the second solid lubricating coating to be lower than the coefficient of friction of the high-friction solid lubricating coating. The coefficient of friction of the second solid lubricating coating can be adjusted by the content of the lubricating powder. Accordingly, as stated above, if the content of a lubricating powder is made small, this type of solid lubricating coating can also be used as a high-friction solid lubricating coating.

The binder can be an organic resin or an inorganic polymer.

The organic resin is preferably one having heat resistance and suitable hardness and wear resistance. Examples of such a resin are thermosetting resins such as epoxy resins, polyimide resins, polycarbodiimide resins, phenolic resins, furan resins, and silicone resins; and thermoplastic resins such as polyolefins, polystyrenes, polyurethanes, polyimides, polyesters, polycarbonates, acrylic resins, thermoplastic epoxy resins, polyamide-imide resins, polyether ether ketones, and polyether sulfones. The resin which is used may be a copolymer or a blend of two or more resins.

When the binder is a thermosetting resin, from the standpoints of adhesion and wear resistance of a thermosetting solid lubricating coating, it is preferable to perform heat setting treatment. The temperature of this heat setting treatment is preferably at least 120° C. and more preferably 150-380° C., and the treatment time is preferably at least 30 minutes and more preferably 30-60 minutes.

When the binder is a thermoplastic resin, it is possible to employ a coating composition using a solvent, but it is also possible to form a thermoplastic solid lubricating coating without a solvent using the hot melt method. In the hot melt method, a coating composition containing a thermoplastic resin and a lubricating powder is heated to melt the thermoplastic resin, and the composition which has become a low viscosity fluid is sprayed from a spray gun having a temperature maintaining ability which maintains a constant temperature (normally a temperature which is around the same as the temperature of the composition in a molten state). The heating temperature of the composition is preferably 10-50° C. higher than the melting point of the thermoplastic resin (the melting temperature or the softening point). In this method, it is suitable to use a thermoplastic resin having a melting point of 80-320° C. and preferably 90-200° C.

The substrate which is coated (namely, the contact surface of the pin and/or the box) is preferably preheated to a temperature higher than the melting point of the thermoplastic resin. As a result, it is possible to obtain good coating properties. When the coating composition contains a small amount (such as at most 2 mass %) of a surface active agent such as polydimethyl siloxane, it is possible to form a good quality coating even if the substrate is not preheated or even if the preheating temperature is lower than the melting point of the base resin. After coating, the thermoplastic resin is solidified by cooling the substrate by air cooling or natural cooling to form a solid lubricating coating atop the substrate.

The inorganic polymer is a compound having a three-dimensionally crosslinked structure of metal-oxygen bonds such as Ti—O, Si—O, Zr—O, Mn—O, Ce—O, or Ba—O. This compound can be formed by hydrolysis and condensation of a hydrolyzable organometallic compound typified by a metal alkoxide, although hydrolyzable inorganic compound such as titanium tetrachloride can also be used. A preferred metal alkoxide which can be used is one having lower alkoxy groups such as methoxy, ethoxy, isopropoxy, propoxy, isobutoxy, butoxy, or tert-butoxy groups. A preferred metal alkoxide is an alkoxide of titanium or silicon, and a titanium alkoxide is particularly preferable. Among these, titanium isopropoxide is preferred due to its excellent film-forming properties.

The inorganic polymer may contain an alkyl group which may be substituted with a functional group such as an amine or an epoxy group. For example, it is possible to use an organometallic compound in which some of the alkoxy groups are replaced by an alkyl group containing a functional group as is the case with silane coupling agents and titanate coupling agents.

When the binder is an inorganic polymer, a lubricating powder is added to a solution of a metal alkoxide or a partial hydrolysate thereof and dispersed therein, and the resulting composition is applied to the contact surface of at least one of a pin and a box. The resulting coating may be subjected to humidifying treatment and then heated if necessary, thereby allowing hydrolysis and condensation of the metal alkoxide to proceed and forming a solid lubricating coating in which a lubricating powder is dispersed in a coating formed from an inorganic polymer having metal-oxygen bonds.

Even when using any of the above-described binders, when the coating composition contains a solvent, the solvent may be any of water, a water-miscible organic solvent such as an alcohol, or a water-immiscible organic solvent such as a hydrocarbon or an ester. Two or more types of solvents may be used in combination.

In addition to a lubricating powder, various additives such as a rust-preventing agent can be added to the solid lubricating coating within a range that does not impair the galling resistance of the coating. For example, the rust-preventing properties of the solid lubricating coating itself can be improved by adding one or more of zinc powder, a chromium pigment, silica, and an alumina pigment. A particularly preferred rust-preventing agent is calcium ion exchanged silica. A solid lubricating coating may also contain an inorganic powder in order to adjust the sliding properties of the coating. Examples of such an inorganic powder are titanium dioxide and bismuth oxide. These rust-preventing agents, inorganic powders, and the like (namely, powder components other than a lubricating powder) can be present in a total amount of up to 20% of the solid lubricating coating.

In addition to the above components, the solid lubricating coating may contain auxiliary additives selected from a surface active agent, a colorant, an antioxidant, and the like in an amount of at most 5%, for example. It is also possible to contain an extreme pressure agent, a liquid lubricant, or the like in a very small amount of at most 2%.

For the same reasons as given for the viscous liquid lubricating coating, the thickness of the solid lubricating coating is preferably 5-150 μm and more preferably 20-100 μm. When the solid lubricating coating is formed atop a high-friction solid lubricating coating, the total thickness of the high-friction solid lubricating coating and the solid lubricating coating is preferably at most 150 μm.

[Solid Anticorrosive Coating]

As stated above with respect to FIG. 4, during the time until actual use of a tubular threaded joint, a protector is often mounted on a pin or box which has not been connected to another member. It is necessary for a solid anticorrosive coating not to be destroyed under at least a force applied during mounting of a protector, not to be dissolved even when exposed to water which condenses below the dew point during transport or storage, and not to easily soften at high temperatures exceeding 40° C. Any coating which can satisfy such properties can be used as a solid anticorrosive coating. For example, a solid anticorrosive coating may be a thermosetting resin coating optionally containing a rust-preventing component.

A preferred solid anticorrosive coating is a coating based on an ultraviolet curing resin. Known resin compositions comprising at least a monomer, an oligomer, and a photopolymerization initiator can be used as an ultraviolet curing resin.

Examples of monomers include but are not limited to polyvalent (di-, tri-, or higher) esters of a polyvalent alcohol with a (meth)acrylic acid, various (meth)acrylate compounds, N-vinylpyrrolidone, N-vinylcaprolactam, and styrene. Examples of oligomers include but are not limited to epoxy (meth)acrylates, urethane (meth)acrylates, polyester (meth)acrylates, polyester (meth)acrylates, polyether (meth) acrylates, and silicone (meth)acrylates.

Useful photopolymerization initiators are compounds having absorption in the wavelength range of 260-450 nm, including benzoin and its derivatives, benzophenone and its derivatives, acetophenone and its derivatives, Michler's ketone, benzil and its derivatives, tetralkylthiuram monosulfide, thioxanes, and the like. It is particularly preferred to use a thioxane.

From the standpoints of coating strength and sliding properties, a solid anticorrosive coating formed from an ultraviolet curing resin may contain an additive selected from a lubricant and/or a fibrous filler and a rust-preventing agent. Examples of a lubricant are metal soaps such as calcium stearate and zinc stearate, and polytetrafluoroethylene (PTFE) resin. An example of a fibrous filler is acicular calcium carbonate such as Whiskal sold by Maruo Calcium Co., Ltd. One or more of these additives can be added in an amount of 0.05-0.35 parts by mass with respect to 1 part by mass of the ultraviolet curing resin. Examples of a rust-preventing agent are aluminum tripolyphosphate and aluminum phosphite. It can be added in a maximum amount of around 0.10 parts by mass with respect to 1 part by mass of the ultraviolet curing resin.

A solid anticorrosive coating which is formed from an ultraviolet curing resin is often transparent. From the standpoint of facilitating quality inspection of the resulting solid anticorrosive coating either visually or by image processing (investigating whether there is a coating and the uniformity or nonuniformity of the coating thickness), the solid anticorrosive coating may contain a colorant. The colorant which is used can be selected from pigments, dyes, and fluorescent materials. The amount of a colorant is preferably a maximum of 0.05 parts by mass with respect to one part by mass of the ultraviolet curing resin.

A preferred colorant is a fluorescent material. A fluorescent material may be any of fluorescent pigments, fluorescent dyes, and fluophors used in fluorescent paints, but preferably it is a fluorescent pigment. A solid anticorrosive coating which contains a fluorescent material is colorless or transparent with a color under visible light, but when it is irradiated with a black light or ultraviolet rays, it fluoresces and becomes colored, making it possible to ascertain the presence of a coating or whether there is unevenness of the coating. Furthermore, as it is transparent under visible light, the material underneath the solid anticorrosive coating, namely, the surface of the substrate can be observed. Accordingly, inspection for damage to the threaded portions of the threaded joint is not impeded by a solid anticorrosive coating.

After a composition based on an ultraviolet curing resin is applied to a contact surface of a threaded joint, it is irradiated with ultraviolet light to cure the coating, resulting in the formation of a solid anticorrosive coating based on an ultraviolet curing resin. Irradiation with ultraviolet light can use a usual commercially available ultraviolet light irradiation apparatus having an output wavelength in the range of 200-450 nm. Examples of a source of ultraviolet light are a high pressure mercury vapor lamp, an ultrahigh pressure mercury vapor lamp, a xenon lamp, a carbon arc lamp, a metal halide lamp, and sunlight.

The coating thickness of a solid anticorrosive coating (the overall coating thickness when there are two or more layers of an ultraviolet curing resin) is preferably in the range of 5-50 μm and more preferably in the range of 10-40 μm. If the coating thickness of the solid anticorrosive coating is too small, it does not adequately function as a anticorrosive coating. On the other hand, if the coating thickness of the solid anticorrosive coating is too large, the solid anticorrosive coating is sometimes destroyed under the force of mounting when installing a protective member such as a protector, and corrosion prevention ends up being inadequate.

A solid anticorrosive coating based on an ultraviolet curing resin is a transparent coating, so the condition of the substrate can be observed through the coating without removing it, and it is possible to inspect the threaded portions before makeup from atop the coating. Accordingly, by forming the solid anticorrosive coating on the contact surface of a pin, it is possible to easily inspect for damage of the threaded portion of the pin which is typically formed on the outer surface of an end of a steel pipe and which is easily damaged.

As stated above with respect to the high-friction solid lubricating coating, each of the above-described viscous liquid lubricating coating, solid lubricating coating, and solid anticorrosive coating is preferably applied by spray coating. Spray coating includes hot melt coating.

As shown in FIG. 5(A), when a high-friction solid lubricating coating is formed on the unthreaded metal contact portion of a contact surface and a second lubricating coating is formed on the threaded portion which is the remaining portion of the contact surface, either the high-friction solid lubricating coating or the second lubricating coating may be formed first. In this case, particularly when to the second lubricating coating is a solid lubricating coating, it is preferable to make the thicknesses of the high-friction solid lubricating coating and the solid lubricating coating approximately the same (for example, within ±15 μm) so that a large step does not develop at the border between the two types of coatings. When the second lubricating coating is a viscous liquid lubricating coating, it has a large ability to deform at the time of makeup, so the second lubricating coating and the high-friction solid lubricating coating may have a large difference in their thicknesses. Normally, the viscous liquid lubricating coating has a larger coating thickness than the high-friction solid lubricating coating.

[Preparatory Surface Treatment]

In a tubular threaded joint according to the present invention in which a high-friction solid lubricating coating and a second lubricating coating and in some cases also a solid anticorrosive coating are formed on the contact surfaces of a pin and/or a box, if preparatory surface treatment for surface roughening is carried out on the contact surfaces which are the substrate for the coatings so that the surface roughness is greater than 3-5 μm, which is the surface roughness after machining, the coating adhesion increases, and there is a tendency for the desired effects of the coatings to be enhanced. Accordingly, before forming a coating, it is preferable to carry out preparatory surface treatment on the contact surfaces to roughen the surfaces.

When a coating is formed atop a contact surface having a large surface roughness, the thickness of the coating is preferably larger than Rmax of the contact surface so as to completely cover the contact surface. When the contact surface is rough, the thickness of a coating is the average value of the overall coating thickness which is calculated from the area, the mass, and the density of the coating.

Examples of preparatory surface treatment for surface roughening are blasting treatment by projecting a blasting material such as spherical shot or angular grit, pickling by immersion in a strong acid such as sulfuric acid, hydrochloric acid, nitric acid, or hydrofluoric acid to roughen the surface, chemical conversion treatment such as phosphate treatment, oxalate treatment, or borate treatment (as the resulting crystals grow, the roughness of the crystal surface increases), electroplating with a metal such as Cu, Fe, Sn, or Zn or an alloy of these to metals (projections are selectively plated, so the surface is slightly roughened), and impact plating which can form a porous plated coating. As one type of electroplating, composite plating which forms a plated coating in which minute solid particles are dispersed in metal is possible as a method of imparting surface roughness because the minute solid particles project from the plated coating. Preparatory surface treatment may use two or more methods in combination. Treatment can be carried out in accordance with known methods.

Whichever preparatory surface treatment method is used for the contact surfaces, the surface roughness Rmax produced by preparatory surface treatment for surface roughening is preferably 5-40 μm. If Rmax is less than 5 μm, adhesion of a lubricating coating formed thereon and retention of the coating may become inadequate. On the other hand, if Rmax exceeds 40 μm, friction increases, the coating may be unable to withstand shearing forces and compressive forces at the time of a high pressure, and the coating may be easily destroyed or peeled off.

From the standpoint of the adhesion of the lubricating coating, preparatory surface treatment which can form a porous coating, namely, chemical conversion treatment and impact plating are preferred. With these methods, in order to make Rmax of the porous coating at least 5 μm, the coating thickness is preferably made at least 5 μm. There is no particular upper limit on the coating thickness, but normally at most 50 μm and preferably at most 40 μm is sufficient. If a lubricating coating is formed atop a porous coating which is formed by preparatory surface treatment, the adhesion of the lubricating coating is increased by the so-called "anchor effect". As a result, it becomes difficult for peeling of the solid lubricating coating to take place under repeated makeup and breakout, contact between metals is effectively prevented, and galling resistance, gas tightness, and corrosion resistance are further increased.

Particularly preferred types of preparatory surface treatment for forming a porous coating are phosphate chemical conversion treatment (treatment with manganese phosphate, zinc phosphate, iron manganese phosphate, or zinc calcium phosphate) and formation of a zinc or zinc-iron alloy coating by impact plating. A manganese phosphate coating is preferable from the standpoint of adhesion, and a zinc or zinc-iron alloy coating which can be expected to provide a sacrificial corrosion-preventing effect by zinc is preferable from the standpoint of corrosion resistance.

Phosphate chemical conversion treatment (phosphating) can be carried out by immersion or spraying in a conventional manner. An acidic phosphating solution which is normally used for zinc-plated materials can be used as a chemical conversion treatment solution. For example, a zinc phosphating solution containing 1-150 g/L of phosphate ions, 3-70 g/L of zinc ions, 1-100 g/L of nitrate ions, and 0-30 g/L of nickel ions can be used. It is also possible to use a manganese phosphating solution which is normally used for threaded joints. The temperature of the solution can be from room temperature to 100° C., and the duration of treatment can be up to 15 minutes depending upon the desired coating thickness. In order to promote the formation of a coating, prior to phosphate treatment, an aqueous surface conditioning solution containing colloidal titanium can be supplied to the surface to be treated. After phosphate treatment, washing is preferably performed with cold or warm water followed by drying.

Impact plating can be carried out by mechanical plating in which particles are impacted with a material to be plated inside a rotating barrel, or by blast plating in which particles are impacted against a material to be plated using a blasting machine. In the present invention, it is sufficient to plate just a contact surface, so it is preferable to employ blast plating which can perform localized plating. The thickness of a zinc or zinc alloy layer which is formed by impact plating is preferably 5-40 µm from the standpoints of both corrosion resistance and adhesion.

For example, particles having an iron core coated with zinc or a zinc alloy are blasted against the contact surface to be coated. The content of zinc or a zinc alloy in the particles is preferably in the range of 20-60 mass %, and the diameter of the particles is preferably in the range of 0.2-1.5 mm. As a result of blasting, only the zinc or zinc alloy which is the coating layer of the particles adheres to the contact surface which forms a substrate, and a porous coating made of zinc or a zinc alloy is formed atop the contact surface. This impact plating can form a porous metal plated coating having good adhesion to a steel surface regardless of the composition of the steel.

As another type of preparatory surface treatment, although it produces almost no surface roughening effect, electroplating in one or more specific layers may improve the adhesion of the lubricating coating to the substrate and may improve the galling resistance of a tubular threaded joint.

Examples of such preparatory surface treatment for a lubricating coating are electroplating with a metal such as Cu, Sn, or Ni or alloys of these metals. Plating may be single-layer plating or multiple-layer plating with two or more layers. Specific examples of this type of electroplating are Cu plating, Sn plating, Ni plating, Cu—Sn alloy plating, Cu—Sn—Zn alloy plating, two-layer plating by Cu plating and Sn plating, and three-layer plating by Ni plating, Cu plating, and Sn plating. Particularly a tubular threaded joint made from a steel having a Cr content exceeding 5% is susceptible to galling, and therefore it is preferably subjected to preparatory surface treatment in the form of single-layer plating with a Cu—Sn alloy or a Cu—Sn—Zn alloy or multiple-layer plating with two or more layers selected from these alloy platings and Cu plating, Sn plating, and Ni plating such as two-layer plating by Cu plating and Sn plating, two-layer plating by Ni plating and Sn plating, two-layer plating by Ni plating and Cu—Sn—Zn alloy plating, and three-layer plating by Ni plating, Cu plating, and Sn plating are preferred.

These types of plating can be formed by the method described in JP 2003-74763A. In the case of multiple-layer plating, the lowermost layer of plating (usually Ni plating) is preferably an extremely thin plating layer referred to as strike plating and having a thickness of less than 1 µm. The plating thickness (the overall thickness in the case of multiple-layer plating) is preferably in the range of 5-15 µm.

It is possible to form a solid anticorrosive coating as another preparatory surface treatment method.

When the second lubricating coating is a viscous liquid lubricating coating, in order to reduce the surface tackiness of this coating, a thin, dry solid coating (e.g., having a thickness of 10-50 µm) may be formed as an upper layer of the lubricating coating. This dry solid coating can be a usual resin coating (such as a coating of an epoxy resin, a polyamide resin, a polyamide-imide resin, or a vinyl resin) and it can be formed from either a water-based composition or an organic solvent-based composition. The coating may also contain a small amount of wax in order to afford lubricity.

EXAMPLES

The effects of the present invention will be illustrated by the following examples and comparative examples. In the following explanation, the contact surface of a pin including the threaded portion and the unthreaded metal contact portion will be referred to as the pin surface, and the contact surface of a box including the threaded portion and the unthreaded metal contact portion will be referred to as the box surface. The surface roughness is expressed as Rmax. Unless particularly specified, % means mass %.

The pin surface and the box surface of commercially available special threaded joints (VAM TOP with an outer diameter of 17.78 cm (7 inches) and a wall thickness of 1.036 cm (0.408 inches) manufactured by Sumitomo Metal Industries, Ltd.) made from carbon steel A, Cr—Mo steel B, or 13% Cr steel C having the composition shown in Table 1 were subjected to preparatory surface treatment as shown in Table 2. Then, as shown in Table 3, a high-friction solid lubricating coating and a second lubricating coating selected from a viscous liquid lubricating coating and a solid lubricating coating and sometimes a solid anticorrosive coating were formed on the pin surface and the box surface.

The details of treatment and the coating composition will be described below. In Table 3, the unthreaded metal contact portion means the seal portion and the shoulder portion, and the threaded portion means the portion of the contact surface other than the seal portion and the shoulder portion. When forming different coatings on the unthreaded metal contact portion and the threaded portion, first the high-friction solid lubricating coating was formed on the unthreaded metal contact portion, and then the indicated lubricating coating was formed on the threaded portion. When forming a lubricating coating on the threaded portion, a shielding plate was used so as not to form the lubricating coating atop the high-friction solid lubricating coating which was formed on the unthreaded metal contact portion. However, the border between these coatings need not be clear, and the effects of the present invention can be obtained even when there is an overlapping region of around 1 mm.

The coefficients of friction of the high-friction solid lubricating coating, the viscous liquid lubricating coating, and the solid lubricating coating which were formed were the maximum coefficients of friction under steady state conditions when the coefficients of friction were measured by the above-mentioned Falex testing method with a pressure of 1 GPa. Measurement was carried out in accordance with ASTM D2670. The pin used for measurement had a diameter of 6.35 mm (¼ inch), and 2 Vee blocks had a V-shaped groove with an included angle of 96° and a groove width of 6.35 mm (¼ inch). The pin and the blocks were prepared by cutting them from a billet of the same steel as the threaded joint to be tested, and they underwent the same preparatory surface treatment and coating treatment as the surface of the pin and the box, respectively, of the threaded joint to be tested.

Figure 1:
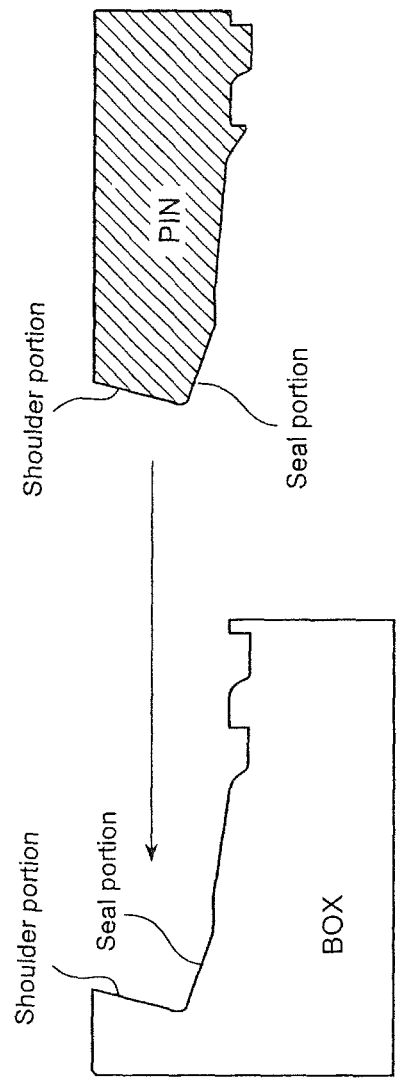
FIG. 1 schematically shows the unthreaded metal contact portions (the shoulder portions and seal portions) of a special threaded joint.
Figure 2:
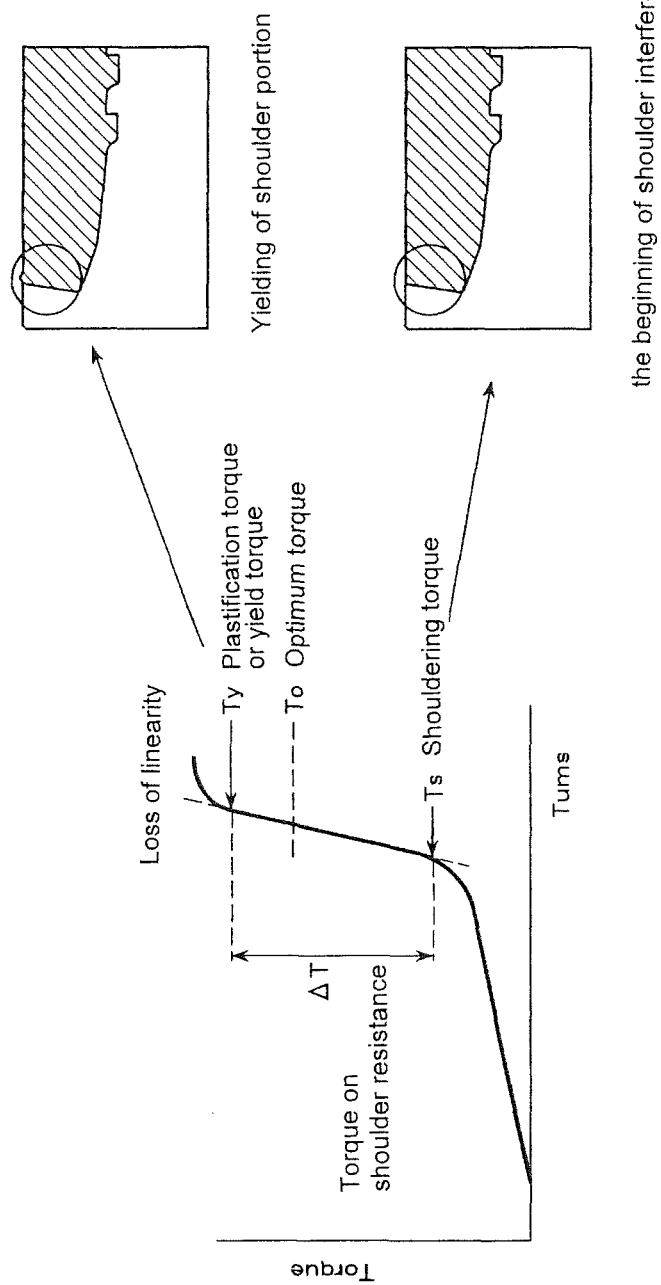
FIG. 2 is a typical torque chart at the time of makeup of a special threaded joint.

A high torque test in which makeup was carried out with a high makeup torque was performed on a tubular threaded joint which was prepared in the above-described manner to obtain a torque chart like that shown in FIG. 2. The values for Ts (the shouldering torque), Ty (the yield torque), and ΔT (the torque-on-shoulder resistance=Ty−Ts) were measured on the torque chart.

Ts was the torque at the start of interference of the shoulder portions. Specifically, Ts was the torque when the change in torque which appeared when the shoulder portions interfered began to enter a linear region (region of elastic deformation). Ty was the torque at the start of plastic deformation. Specifically, Ty was the torque when the torque began to leave the linear region after Ts was reached in which the change in torque with the number of turns was linear. ΔT (=Ty−Ts) was made 100 for Comparative Example 1 in Table 3 using a conventional compound grease. Table 4 shows the results of comparison of other examples with this value of ΔT.

A repeated makeup and breakout test was carried out on each tubular threaded joint, and galling resistance was evaluated. In the repeated makeup and breakout test, makeup of a threaded joint was carried out with a makeup speed of 10 rpm and a high makeup torque of 20 kN-m, and after breakout, the state of galling of the pin surface and the box surface was investigated. In cases in which seizing scratches which developed due to makeup were light and repeated makeup was possible if repair was performed, repair was carried out and makeup and breakout were continued. Makeup was carried out 10 times (for 10 cycles). Table 4 also shows the results of this test.

TABLE 1

| | Steel composition of threaded joint (mass %, remainder: Fe and impurities) | | | | | | | | |
|---|---|---|---|---|---|---|---|---|---|
| Mark | C | Si | Mn | P | S | Cu | Ni | Cr | Mo |
| A | 0.24 | 0.3 | 1.3 | 0.02 | 0.01 | 0.04 | 0.07 | 0.17 | 0.04 |
| B | 0.25 | 0.25 | 0.8 | 0.02 | 0.01 | 0.04 | 0.05 | 0.95 | 0.18 |
| C | 0.19 | 0.25 | 0.8 | 0.02 | 0.01 | 0.04 | 0.1 | 13 | 0.04 |

TABLE 2

| | Preparatory surface treatment | | Steel |
|---|---|---|---|
| No. | Pin | Box | mark |
| Example 1 | 1. Machine grinding (R = 3)<br>2. Zn phosphating (R = 8) (t = 12) | 1. Machine grinding (R = 3)<br>2. Mn phosphating (R = 12) (t = 15) | A |
| Example 2 | Sand blasting (R = 10) | 1. Machine grinding (R = 3)<br>2. Ni strike plating + Cu plating (R = 3) (t = 12) | C |
| Example 3 | 1. Machine grinding (R = 3)<br>2. Zn phosphating (R = 8) (t = 12) | 1. Machine grinding (R = 3)<br>2. Ni strike plating + Cu—Sn—Zn alloy plating (R = 2) (t = 7) | B |
| Example 4 | 1. Machine grinding (R = 3)<br>2. Zn phosphating (R = 8) (t = 12) | 1.Machine grinding (R = 3)<br>2.Ni strike plating + Cu—Sn—Zn alloy plating (R = 2) (t = 7) | B |
| Compar. Example 1 | 1. Machine grinding (R = 3)<br>2. Zn phosphating (R = 8) (t = 12) | 1. Machine grinding (R = 3)<br>2. Mn phosphating (R = 12) (t = 15) | A |
| Compar. Example 2 | 1. Machine grinding (R = 3)<br>2. Zn phosphating (R = 8) (t = 12) | 1. Machine grinding (R = 3)<br>2. Mn phosphating (R = 10) (t = 12) | B |
| Compar. Example 3 | 1. Machine grinding (R = 3)<br>2. Zn phosphating (R = 8) (t = 12) | 1. Machine grinding (R = 3)<br>2. Mn phosphating (R = 10) (t = 12) | B |
| Compar. Example 4 | 1. Machine grinding (R = 3)<br>2. Zn phosphating (R = 8) (t = 12) | 1. Machine grinding (R = 3)<br>2. Mn phosphating (R = 10) (t = 12) | B |
| Compar. Example 5 | 1. Machine grinding (R = 3)<br>2. Zn phosphating (R = 8) (t = 12) | 1. Machine grinding (R = 3)<br>2. Mn phosphating (R = 10) (t = 12) | B |

R: surface roughness (μm); t: coating thickness (μm)

TABLE 3

| | | Pin | | Box | |
|---|---|---|---|---|---|
| No. | Layer | Unthreaded metal contact portion | Threaded portion | Unthreaded metal contact portion | Threaded portion |
| Example 1 | — | High-friction solid lubricating coating | Viscous liquid lubricating coating | High-friction solid lubricating coating | Viscous liquid lubricating coating |
| Example 2 | Lower | High-friction solid lubricating coating | | Viscous liquid lubricating coating | |
| | Upper | Viscous liquid lubricating coating | | | |
| Example 3 | Lower | High-friction solid lubricating coating | | High-friction solid lubricating coating | |
| | Upper | Viscous liquid lubricating coating | | | |
| Example 4 | — | UV curable solid anticorrosive coating | | High-friction solid lubricating coating | Solid lubricating coating |
| Comp. Ex. 1 | — | Compound grease in viscous liquid form according to API BUL 5A2 | | | |

TABLE 3-continued

| | | Pin | | Box | |
|---|---|---|---|---|---|
| No. | Layer | Unthreaded metal contact portion | Threaded portion | Unthreaded metal contact portion | Threaded portion |
| Comp. Ex. 2 | — | Viscous liquid lubricating coating | | Viscous liquid lubricating coating | |
| Comp. Ex. 3 | — | UV curable solid anticorrosive coating | | Solid lubricating coating | |
| Comp. Ex. 4 | — | High-friction solid lubricating coating | | Viscous liquid lubricating coating | |
| Comp. Ex. 5 | — | UV curable solid anticorrosive coating | | High-friction solid lubricating coating | |

TABLE 4

| No. | ΔT ratio (=Ty − Ts)[1] (Relative value when the value of Comparative Example 1 is 100) | Results of repeated makeup and breakout test with a high torque for 10 cycles |
|---|---|---|
| Example 1 | 125 | no galling through 10 cycles |
| Example 2 | 112 | no galling through 10 cycles |
| Example 3 | 110 | no galling through 10 cycles |
| Example 4 | 105 | no galling through 10 cycles |
| Compar. Ex. 1 | 100 | no galling through 10 cycles |
| Compar. Ex. 2 | 52 | no galling through 10 cycles |
| Compar. Ex. 3 | 70 | no galling through 10 cycles |
| Compar. Ex. 4 | 61 | galling occurred in the 5th cycle |
| Compar. Ex. 5 | not assessable | galling occurred in the 1st cycle |

[1]A value of at least 95 is acceptable for practical use.

Example 1

The pin surface and the box surface of a special threaded joint made of carbon steel having composition A shown in Table 1 were subjected to preparatory surface treatment and coating treatment as described below to form the coating structure shown in FIG. 5(A).

[Box Surface]

After finishing by machine grinding (surface roughness of 3 μm), the box surface underwent preparatory surface treatment by immersion for 10 minutes in a manganese phosphating solution at 80-95° C. to form a manganese phosphate coating having a thickness of 15 μm (surface roughness of 12 μm).

Surflube C291 manufactured by Nippon Paint Co., Ltd. which was diluted with water to a strength of 10% was applied by spray coating to the unthreaded metal contact portion (the seal portion and the shoulder portion) of the box surface which had undergone the preparatory surface treatment to form a high-friction solid lubricating coating having a coating thickness of approximately 10 μm after drying. The coefficient of friction of this solid lubricating coating was 0.1. The threaded portion (the portions other than the seal portion and the shoulder portion) of the box surface which had undergone the preparatory surface treatment was treated so as to form a viscous liquid lubricating coating thereon in the following manner.

The composition of the viscous liquid lubricating coating was 15% of a hydrogenated rosin ester (Ester Gum H manufactured by Arakawa Chemical Industries, Ltd.), 48% of a highly basic calcium sulfonate as a basic metal salt of an aromatic organic acid (Calcinate C-400CLR manufactured by Crompton Corporation, base number of 400 mg KOH/g), 17% of calcium stearate as a metal soap (manufactured by DIC Corporation), 10% of amorphous graphite as a solid lubricant (Blue P manufactured by Nippon Graphite Industries, Ltd.), and 10% of paraffin wax.

After the above-described composition was diluted with 30 parts by mass of an organic solvent (Exxsol D40 manufactured by Exxon Mobil Corporation) per 100 parts by mass of the composition to lower its viscosity, it was applied to the threaded portion of the box surface by spray coating. After evaporation of the solvent, a viscous liquid lubricating coating having a thickness of approximately 50 μm was formed. The coefficient of friction of this lubricating coating was 0.04.

[Pin Surface]

After finishing by machine grinding (surface roughness of 3 μm), the pin surface was subjected to preparatory surface treatment by immersing for 10 minutes in a zinc phosphating solution at 75-85° C. to form a zinc phosphate coating (surface roughness of 8 μm) with a thickness of 12 μm.

The same treatment as for the box surface to form lubricating coatings was carried out on the pin surface which had undergone the preparatory surface treatment. Namely, the above-described high-friction solid lubricating coating was formed on the unthreaded metal contact portion, and the above-described viscous liquid lubricating coating was formed on the threaded portion. The coating thickness and the coefficient of friction of each coating were the same as for the box surface.

As can be seen from Table 4, the value of ΔT in a high torque test was such that the ratio of ΔT when the value of ΔT for Comparative Example 1 was given a value of 100 (referred to below as the ΔT ratio) was 125%. Compared to the ΔT ratio of around 50% for Comparative Example 2 which did not have a high-friction solid lubricating coating on the seal portion or the shoulder portion (the entirety of the pin surface and the box surface was coated with a viscous liquid lubricating coating), the ΔT ratio was greatly increased.

Moreover, ΔT in Example 1 was increased by 25% with respect to ΔT of the reference example using compound grease (Comparative Example 1). Accordingly, it was verified that the threaded joint of Example 1 could be made up with a high torque without the occurrence of yielding of the shoulder portions. In the repeated makeup and breakout test, makeup and breakout could be performed 10 times without the occurrence of galling.

Example 2

The pin surface and the box surface of a special threaded joint made of the 13% Cr steel having composition C shown in Table 1 were subjected to the below-described preparatory surface treatment and coating treatment to form the coating structure shown in FIG. 5(C).
[Box Surface]
After finishing by machine grinding (surface roughness of 3 μm), the box surface underwent Ni strike plating and then Cu plating by electroplating to form a plated coating with an overall thickness of 12 μm. The surface roughness after this preparatory surface treatment was 3 μm.

The same viscous liquid lubricating coating as described in Example 1 was formed by spray coating on the entirety of the box surface which had undergone the preparatory surface treatment. The coating thickness of the viscous liquid lubricating coating after evaporation of the solvent was 80 μm, and its coefficient of friction was 0.04.
[Pin Surface]
The pin surface was subjected to preparatory surface treatment by sandblasting with No. 80 sand to give a surface roughness of 10 μm.

Undiluted Gardolube L6334 manufactured by Chemetall GmbH was applied by spray coating to the unthreaded metal contact portion (the seal portion and the shoulder portion) of the pin surface which had undergone the preliminary surface treatment to form a high-friction solid lubricating coating having a thickness of approximately 15 μm. The coefficient of friction of this high-friction solid lubricating coating was 0.15. The same viscous liquid lubricating coating as was formed on the box surface was formed to the same coating thickness on the entire pin surface including the unthreaded metal contact portion on which the high-friction solid lubricating coating had been formed.

In the high torque test, the ΔT ratio was 112%, confirming that ΔT was larger than for Comparative Example 1 which used compound grease. Of course, makeup and breakout could be carried out 10 times without any problem in the repeated makeup and breakout test.

Example 3

The pin surface and the box surface of a special threaded joint made of the Cr—Mo steel having composition B shown in Table 1 were subjected to the below-described preparatory surface treatment and coating treatment to form the coating structure shown in FIG. 6(C).
[Box Surface]
After finishing by machine grinding (surface roughness of 3 μm), the box surface underwent Ni strike plating followed by Cu—Sn—Zn alloy plating by electroplating to form a plated coating having an overall thickness of 7 μm. The surface roughness after the preparatory surface treatment was 2 μm.

The unthreaded metal contact portion and the threaded portion of the box surface which had undergone the preparatory surface treatment was coated by spray coating with Surflube C291 manufactured by Nippon Paint Co., Ltd. which was diluted with water to a strength of 10% to fours a high-friction solid lubricating coating (coefficient of friction of 0.1) having a coating thickness of approximately 10 μm after drying.
[Pin Surface]
After finishing by machine grinding (surface roughness of 3 μm), the pin surface was immersed for 10 minutes in a zinc phosphating solution at 75-85° C. for preparatory surface treatment to form a zinc phosphate coating (surface roughness of 8 μm) having a thickness of 12 μm.

The unthreaded metal contact portion of the pin surface which had undergone the preparatory surface treatment was coated by spray coating with Surflube C291 manufactured by Nippon Paint Co., Ltd. which was diluted with water to a strength of 10% to form a high-friction solid lubricating coating with a coating thickness of approximately 10 μm (coefficient of friction of 0.1) after drying. Then, the viscous liquid lubricating coating described in Example 1 was formed on the solid lubricating coating and on the threaded portion (namely, on the entire pin surface) by the same method as in Example 1 to a coating thickness of approximately 50 μm.

In the high torque test, the ΔT ratio was 110%, confirming that ΔT was larger than for the compound grease of Comparative Example 1. In the repeated makeup and breakout test, makeup and breakout were performed 10 times without any problems.

Example 4

The pin surface and the box surface of a special threaded joint made of the the Cr—Mo steel having composition B shown in Table 1 were subjected to the below-described preparatory surface treatment and coating treatment to form a coating having the structure shown in FIG. 6(B).
[Box Surface]
After finishing by machine grinding (surface roughness of 3 μm), the box surface underwent Ni strike plating followed by Cu—Sn—Zn alloy plating by electroplating to form a plated coating having an overall thickness of 7 μm. The surface roughness after the preparatory surface treatment was 2 μm.

The unthreaded metal contact portion of the box surface which had undergone the preparatory surface treatment was coated by spray coating with Surflube C291 manufactured by Nippon Paint Co., Ltd. which was diluted to a strength of 10% to form a high-friction solid lubricating coating (coefficient of friction of 0.1) having a coating thickness of approximately 50 μm after drying. On the threaded portion of the box surface which had undergone the preparatory surface treatment, a solid lubricating coating was formed in the following manner.

A lubricating coating composition having the below-described composition was heated at 120° C. in a tank equipped with a stirrer to maintain a molten state having a viscosity suitable for coating, while the box surface which had undergone the preparatory surface treatment described above was preheated to 120° C. by induction heating. Using a spray gun having a spraying head with a heat retaining mechanism, the above-described molten lubricating coating composition was applied to the threaded portion of the preheated box surface. After cooling, a solid lubricating coating having a thickness of 50 μm (coefficient of friction of 0.03) was formed.

The composition of the lubricating coating composition was as follows:

15% carnauba wax,
15% zinc stearate,
5% liquid polyalkyl methacrylate (Viscoplex™ 6-950 manufactured by Rohmax Corporation),
49% corrosion inhibitor (NA-SUL™ Ca/W1935 manufactured by King Industries, Inc.),
3.5% amorphous graphite
1% zinc oxide,
5% titanium dioxide,
5% bismuth trioxide,
1% silicone (polydimethyl siloxane), and
antioxidants (made by Ciba-Geigy Corporation):
0.3% Irganox™ L150 and
0.2% Irgafos™ 168.

[Pin Surface]

After finishing by machine grinding (surface roughness of 3 μm), the pin surface was immersed for 10 minutes in a zinc phosphating solution at 75-85° C. to form a zinc phosphate coating (surface roughness of 8 μm) having a thickness of 12 μm. On the entire pin surface which had undergone this preparatory surface treatment, a solid anticorrosive coating was formed from an ultraviolet curing resin in the following manner.

A coating composition was prepared by adding aluminum zinc phosphate as a rust-preventing agent and polyethylene wax as a lubricant to an epoxy acrylic resin-based ultraviolet curing resin paint composition (solventless type) manufactured by Chugoku Marine Paints, Ltd. The resulting coating composition contained 94% resin, 5% rust-preventing agent, and 1% lubricant based on the total solids content. This coating composition was applied by spraying to the entire pin surface and was irradiated with ultraviolet rays (wavelength of 260 nm) from an air-cooled mercury vapor lamp having an output of 4 kW to cure the coating. The resulting coating had a thickness of 25 μm and was colorless and transparent. The male threaded portion of the pin could be inspected through the coating either with the naked eye or with a magnifying glass.

In the high torque test, the ΔT ratio was 105%. The ΔT ratio was greatly increased compared to Comparative Example 3 in which a high-friction solid lubricating coating was not formed on the unthreaded metal contact portion (the seal portion and the shoulder portion) of the box surface. In addition, the ΔT ratio was increased compared to Comparative Example 1 which used a conventional compound grease. In the repeated makeup and breakout test, makeup and breakout could be carried out 10 times without any problems.

Comparative Example 1

The pin surface and the box surface of a special threaded joint made of the carbon steel having composition A shown in Table 1 were subjected to the below-described preparatory surface treatment and coating treatment.

[Box Surface]

After finishing by machine grinding (surface roughness of 3 μm), the box surface underwent preparatory surface treatment by immersion for 10 minutes in a manganese phosphating solution at 80-95° C. to form a manganese phosphate coating having a thickness of 15 μm (surface roughness of 12 μm). A viscous liquid compound grease in accordance with API BUL 5A2 was applied to the box surface which had undergone this preparatory surface treatment to form a lubricating coating. The coated amount of the compound grease was a total of 50 g on the pin and the box. The coated area was a total of roughly 1400 cm².

[Pin Surface]

After finishing by machine grinding (surface roughness of 3 μm), the pin surface was immersed for 10 minutes in a zinc phosphating solution at 75-85° C. to form a zinc phosphate coating (surface roughness of 8 μm) having a thickness of 12 μm. The same compound grease as was used on the box surface was applied to the pin surface which had undergone this preparatory surface treatment.

As shown in Table 3, during 10 cycles of makeup and breakout in the repeated makeup and breakout test, there was no occurrence of galling through the tenth cycle. However, compound grease contains heavy metal such as lead, so it is harmful to humans and the environment.

In the high torque test, the joint exhibited a high value of Ty with a large value of ΔT by which yielding of the shoulder portions did not occur even when makeup was carried out with a high torque. The values for ΔT ratio in the other examples was calculated with the value of ΔT at this time being made 100.

Comparative Example 2

The pin surface and the box surface of a special threaded joint made of the Cr—Mo steel having composition B in Table 1 were subjected to the following preparatory surface treatment and coating treatment.

[Box Surface]

After finishing by machine grinding (surface roughness of 3 μm), the box surface was immersed for 10 minutes in a manganese phosphating solution at 80-95° C. to form a manganese phosphate coating with a thickness of 12 μm (surface roughness of 10 μm). The viscous liquid lubricating coating described in Example 1 was formed by the same method on the entire box surface which had undergone this preparatory surface treatment. After evaporation of the solvent, a viscous liquid lubricating coating having a thickness of approximately 60 μm was formed. The coefficient of friction of this lubricating coating was 0.04.

[Pin Surface]

After finishing by machine grinding (surface roughness of 3 μm), the pin surface was immersed for 10 minutes in a zinc phosphating solution at 75-85° C. to form a zinc phosphate coating (surface roughness of 8 μm) having a thickness of 12 μm. The same viscous liquid lubricating coating as on the box surface was formed to a thickness of 60 μm on the entire pin surface which had undergone the preparatory surface treatment.

In the repeated makeup and breakout test, the results were extremely good with no occurrence of galling in 10 cycles of makeup and breakout. However, in the high torque test, the ΔT ratio was an extremely small value of 52% compared to the conventional compound grease (Comparative Example 1). Namely, it was again confirmed that if the contact surfaces of a tubular threaded joint are entirely coated only with a viscous liquid lubricating coating having a low coefficient of friction, the ΔT ratio is greatly reduced.

Comparative Example 3

The pin surface and the box surface of a special threaded joint made of the Cr—Mo steel having composition B in Table 1 were subjected to the following preparatory surface treatment and coating treatment.

[Box Surface]

After finishing by machine grinding (surface roughness of 3 μm), the box surface underwent preparatory surface treatment by immersion for 10 minutes in a manganese phosphating solution at 80-95° C. to form a manganese phosphate coating having a thickness of 12 μm (surface roughness of 10 μm). The same solid lubricating coating as described in Example 4 was formed by the same method on the entire box surface which had undergone the preparatory surface treatment. After cooling, a solid lubricating coating having a thickness of approximately 50 μm (coefficient of friction of 0.03) was formed.

[Pin Surface]

After finishing by machine grinding (surface roughness of 3 μm), the pin surface was immersed for 10 minutes in a zinc phosphating solution at 75-85° C. to form a zinc phosphate coating (surface roughness of 8 μm) having a thickness of 12 μm. The same ultraviolet curing resin coating (coating thickness of 25 μm) as described in Example 4 was formed by the same method on the entire pin surface which had undergone the preparatory surface treatment.

In the repeated makeup and breakout test, the results were extremely good with no occurrence of galling in 10 cycles of makeup and breakout. However, in the high torque test, the ΔT ratio was an extremely small value of 70% compared to conventional compound grease.

Comparative Example 4

The pin surface and the box surface of a special threaded joint made of the Cr—Mo steel having composition B in Table 1 were subjected to the following preparatory surface treatment and coating treatment.

[Box Surface]

After finishing by machine grinding (surface roughness of 3 μm), the box surface was immersed for 10 minutes in a manganese phosphating solution at 80-95° C. to form a manganese phosphate coating with a thickness of 12 μm (surface roughness of 10 μm). The same viscous liquid lubricating coating as described in Example 1 was formed by the same method on the entire box surface which had undergone this preparatory surface treatment. After evaporation of the solvent, a viscous liquid lubricating coating having a thickness of approximately 60 μm was formed. The coefficient of friction of this lubricating coating was 0.04.

[Pin Surface]

After finishing by machine grinding (surface roughness of 3 μm), the pin surface was immersed for 10 minutes in a zinc phosphating solution at 75-85° C. to form a zinc phosphate coating (surface roughness of 8 μm) having a thickness of 12 μm. The same high-friction solid lubricating coating as formed on the unthreaded metal contact portion of the pin surface in Example 1 was formed to a thickness of 10 μm on the entire pin surface which had undergone the preparatory surface treatment.

In the repeated makeup and breakout test, the makeup torque was constantly high from the first cycle, and galling occurred in the fifth cycle making it unable to continue the test. In the high torque test, the ΔT ratio was a small value of 61% compared to the conventional compound grease (Comparative Example 1). Namely, when the entire contact surface of one member of a threaded joint was coated with a high-friction solid lubricating coating, the galling resistance was greatly impaired, and due to a considerable increase in the shouldering torque, the ΔT ratio was not improved.

Comparative Example 5

The pin surface and the box surface of a special threaded joint made of the Cr—Mo steel having composition B in Table 1 were subjected to the following preparatory surface treatment and coating treatment.

[Box Surface]

After finishing by machine grinding (surface roughness of 3 μm), the box surface was immersed for 10 minutes in a manganese phosphating solution at 80-95° C. to form a manganese phosphate coating having a thickness of 12 m (surface roughness of 10 μm). The same high-friction solid lubricating coating as formed on the unthreaded metal contact portion of the box surface in Example 4 was formed to a thickness of about 20 μm on the entire box surface which had undergone the preparatory surface treatment.

[Pin Surface]

After finishing by machine grinding (surface roughness of 3 μm), the pin surface was immersed for 10 minutes in a zinc phosphating solution at 75-85° C. to form a zinc phosphate coating (surface roughness of 8 μm) having a thickness of 12 μm. The same ultraviolet curing resin coating (coating thickness of 25 μm) as described in Example 4 was formed by the same method on the entire pin surface which had undergone the preparatory surface treatment.

In the repeated makeup and breakout test, galling occurred in the first cycle, and the test terminated. This premature galling made it unable to evaluate by the high torque test. It was confirmed that the combination of coatings in this example affords poor lubricity leading to a significant worsening in galling resistance, which is the fundamental performance required for a tubular threaded joint.

(Other Tests)

In order to investigate the rust-preventing properties of the tubular threaded joints manufactured in Examples 1-4, the same preparatory surface treatment and formation of lubricating coating or coatings as for the box in Table 2 were performed on a separately prepared coupon test piece (70 mm×150 mm×1.0 mm thick). Each test piece was subjected to a salt spray test (in accordance with JIS Z 2371 (corresponding to ISO 9227) at a temperature of 35° C. for 1000 hours) or a humidity resistance test (in accordance with JIS K 5600-7-2 (corresponding to ISO 6270) at a temperature of 50° C. and a relative humidity of 98% for 200 hours), and the occurrence of rust was investigated. As a result, it was ascertained that there was no occurrence of rust on the tubular threaded joints of Examples 1-4 in either of the tests.

When each of the examples of tubular threaded joints underwent a gas tightness test and an actual use test in an actual excavating apparatus, each joint exhibited satisfactory properties. It was confirmed that makeup could be stably carried out with these joints even when the makeup torque was high due to the values for ΔT which were larger than with conventionally used compound grease.

The invention claimed is:

1. A tubular threaded joint constituted by a pin and a box each having a contact surface comprising an unthreaded metal contact portion including a seal portion and a shoulder portion and a threaded portion, characterized in that the contact surface of at least one of the pin and the box has a first lubricating coating and a second lubricating coating, the first lubricating coating being a solid lubricating coating formed on the unthreaded metal contact portion of the contact surface, the second lubricating coating being selected from a viscous liquid lubricating coating and a solid lubricating coating and formed on at least the portion of the contact surface where the first lubricating coating is not present, the first lubricating coating having a coefficient of friction which is higher than that of the second lubricating coating, the second lubricating coating being positioned on top if there is a portion of the contact surface in which both the first lubricating coating and the second lubricating coating are present.

2. A tubular threaded joint as set forth in claim 1 wherein the threaded portion of the contact surface has the second lubricating coating.

3. A tubular threaded joint as set forth in claim 1 wherein the entirety of the contact surface has the second lubricating coating formed atop the first lubricating coating.

4. A tubular threaded joint as set forth in claim 1 wherein the contact surface of one member of the pin and the box has the first lubricating coating formed on a portion of the contact surface including the shoulder portion and the second lubricating coating formed on at least the portion of the contact surface where the first lubricating coating is not present, and the contact surface of the other member of the pin and the box has a coating selected from a lubricating coating which is selected from a viscous liquid lubricating coating and a solid lubricating coating; a solid anticorrosive coating; and a two-layer coating comprising a lower layer in the form of a lubricating coating selected from a viscous liquid lubricating coating and a solid lubricating coating and an upper layer in the form of a solid anticorrosive coating.

5. A tubular threaded joint as set forth in claim 4 wherein the solid anticorrosive coating is based on an ultraviolet curing resin.

6. A tubular threaded joint as set forth in claim 1 wherein the contact surface of at least one of the pin and the box is subjected to surface treatment by a method selected from blasting, pickling, phosphate chemical conversion treatment, oxalate chemical conversion treatment, borate chemical conversion treatment, electroplating, impact plating, and two or more of these methods prior to forming the lubricating coating or anticorrosive coating.

7. A tubular threaded joint as set forth in claim 1 wherein the first lubricating coating has a thickness of 5-40 μm.

8. A tubular threaded joint as set forth in claim 7 wherein the second lubricating coating is a viscous liquid lubricating coating having a thickness of 5-200 μm, and when this second lubricating coating is positioned atop the first lubricating coating, the total thickness of the first lubricating coating and the second lubricating coating is at most 200 μm.

9. A tubular threaded joint as set forth in claim 7 wherein the second lubricating coating is a solid lubricating coating having a thickness of 5-150 μm, and when this second lubricating coating is positioned atop the first lubricating coating, the total thickness of the first lubricating coating and the second lubricating coating is at most 150 μm.

* * * * *